(12) United States Patent
Xiao et al.

(10) Patent No.: US 12,131,443 B2
(45) Date of Patent: Oct. 29, 2024

(54) IMAGE PROCESSING METHOD AND RELATED DEVICE

(71) Applicant: HUAWEI TECHNOLOGIES CO., LTD., Guangdong (CN)

(72) Inventors: Xizhong Xiao, Shenzhen (CN); Zhe Wei, Shenzhen (CN); Chung Yuen Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 466 days.

(21) Appl. No.: 17/484,063

(22) Filed: Sep. 24, 2021

(65) Prior Publication Data

US 2022/0012851 A1     Jan. 13, 2022

Related U.S. Application Data

(63) Continuation of application No. PCT/CN2020/081129, filed on Mar. 25, 2020.

(30) Foreign Application Priority Data

Mar. 25, 2019    (CN) .......................... 201910230214.0

(51) Int. Cl.
    *G06T 5/70*            (2024.01)
    *G06T 7/194*          (2017.01)
    *G06T 7/50*            (2017.01)

(52) U.S. Cl.
    CPC ............... *G06T 5/70* (2024.01); *G06T 7/194* (2017.01); *G06T 7/50* (2017.01);
(Continued)

(58) Field of Classification Search
None
See application file for complete search history.

(56) References Cited

U.S. PATENT DOCUMENTS 9,105,088 B1 *   8/2015   Petrie .................... G06T 5/75
9,131,150 B1 *   9/2015   Mangiat ................ H04N 23/72
(Continued)

FOREIGN PATENT DOCUMENTS

CN        102103690 A      6/2011
CN        103473780 A     12/2013
(Continued)

OTHER PUBLICATIONS

CN 107977940 A Translation (Year: 2018).*
(Continued)

*Primary Examiner* — Soo Shin

(57) ABSTRACT

An image processing method is disclosed. The method includes: obtaining an image including a target portrait, where the image includes a foreground and a background, and the target portrait corresponds to the foreground; determining a target hairline from the image, where the target hairline includes a part that overlaps with the background; and performing blur processing on the image to obtain a target image, where the target hairline is blurred to a smaller degree than the background is blurred, and the target portrait is blurred to a smaller degree than the background is blurred. This image processing method may highlight details of a portrait, so that these details, for example a hairline, scattered in a background, are not considered as the background to be blurred, thereby improving the experience of portrait photography.

17 Claims, 14 Drawing Sheets

(52) U.S. Cl.
CPC ............... *G06T 2207/10004* (2013.01); *G06T 2207/10024* (2013.01); *G06T 2207/20092* (2013.01)

(56) References Cited

U.S. PATENT DOCUMENTS

| | | | | |
|---|---|---|---|---|
| 10,217,195 | B1* | 2/2019 | Agrawal | G06T 7/194 |
| 2012/0120269 | A1* | 5/2012 | Capata | G06F 18/2148 |
| | | | | 348/222.1 |
| 2015/0374306 | A1* | 12/2015 | Gelbman | G06V 40/171 |
| | | | | 600/476 |
| 2019/0244362 | A1* | 8/2019 | Movshovitz-Attias | |
| | | | | G06N 3/048 |
| 2020/0312002 | A1* | 10/2020 | Comploi | G06V 40/172 |
| 2021/0019892 | A1* | 1/2021 | Zhou | G06V 40/162 |
| 2021/0073953 | A1* | 3/2021 | Lee | G06T 5/70 |
| 2023/0124252 | A1* | 4/2023 | Liu | G06T 11/00 |
| | | | | 345/589 |

FOREIGN PATENT DOCUMENTS

| | | | | |
|---|---|---|---|---|
| CN | 104417246 | A | | 3/2015 |
| CN | 104978708 | A | | 10/2015 |
| CN | 105139438 | A | | 12/2015 |
| CN | 107977940 | A * | 5/2018 | G06T 5/008 |
| CN | 108053363 | A | | 5/2018 |
| CN | 109285178 | A | | 1/2019 |

OTHER PUBLICATIONS

Gong et al., "Using Depth Mapping to realize Bokeh effect with a single camera Android device," Stanford University, EE368 Project Report, 2016 (Year: 2016).*
Shen et al., "Deep Automatic Portrait Matting," ECCV 2016, Part I, LNCS 9905, pp. 92-107, 2016. DOI: 10.1007/978-3-319-46448-0_6 (Year: 2016).*
Xiaoyong Shen et al, Deep Automatic Portrait Matting, Springer International Publishing AG 2016, B. Leibe et al. (Eds.): ECCV 2016, Part I, LNCS 9905, Sep. 17, 2016, total 16 pages.
Jie Gong et al, Using Depth Mapping to realize Bokeh effect with a single camera Android device, EE368 Project Report, Jan. 1, 2016, total 9 pages.
Extended European Search Report issued in EP20776790.6, dated Apr. 7, 2022, 16 pages.
Office Action issued in CN201910230214.0, dated Feb. 20, 2023, 11 pages.
Xiaoyong Shen et al, Deep Automatic Portrait Matting, European Conference on Computer Vision-ECCV 2016: Computer Vision-ECCV 2016, total 896 pages.
International Search Report and Written Opinion issued in PCT/CN2020/081129, dated Jun. 15, 2020, 9 pages.

* cited by examiner

IMAGE PROCESSING METHOD AND RELATED DEVICE

CROSS-REFERENCE TO RELATED APPLICATIONS

This application is a continuation of International Application No. PCT/CN2020/081129, filed on Mar. 25, 2020, which claims priority to Chinese Patent Application No. 201910230214.0, filed on Mar. 25, 2019. The disclosures of the aforementioned applications are hereby incorporated by reference in their entireties.

TECHNICAL FIELD

The present invention relates to the field of image processing, and in particular, to an image processing method and a related device.

BACKGROUND

In the field of photographing or the field of image processing, an image may include a foreground and a background. The foreground may usually correspond to a main object that needs to be highlighted or emphasized in the image, and the background is a part that sets off the main object in the image. For example, a portrait is a main object in portrait photography. To highlight the portrait, a background board may be arranged or some views may be found as backgrounds for setting off. After an image is obtained through photographing, the image usually needs to be further processed to obtain a better presentation effect. For example, a background blur function may be used to highlight a main body. Currently, there are usually three manners to implement the background blur function.

One manner is photographing blur by a single-lens reflex camera. However, a process of photographing blur by the single-lens reflex camera is a strict optical process with a clear physical meaning, and detail effects are presented naturally and richly. However, such presentation is established based on a bulky optical module and camera body, which is deviated from a trend that consumers are increasingly pursuing lightness and quickness and a fine effect.

Another manner is photographing blur by a dual camera of a mobile phone. Existing photographing blur by a dual camera at a mobile phone mainly relies on stereo matching. For a pair of corrected images, an image block is randomly selected from a first image, and a corresponding image block is found by searching, in a preset direction, a second image. The two image blocks are matched with each other, and a difference between central coordinates of the two image blocks in the preset direction of the two images is referred to as a parallax. A larger parallax indicates a closer distance. After the information is used in a blurring process, a photographing effect of bokeh may be implemented. An existing technical solution for photographing blur at a mobile phone relies on a value of a matched resolution of a dual camera image and robustness of a matching algorithm, and is restrained by an operational performance and a block matching basis of the matching algorithm. As a result, it is difficult to calculate a parallax result of a hair bundle-level/hairline-level detail.

In addition, another manner is photographing blur by a single camera of a mobile phone. For example, a single pure RGB image is used as an input, and a human body area is obtained through segmentation by mainly relying on semantic segmentation. A human body foreground is reserved, a background is considered as a distant view for blurring, and an entire image is equivalent to having two layers of depths.

In practical application, in an image, there is a boundary area between an edge of a main object and a background, and there is often a phenomenon that a filamentous object of the main object overlaps with the background in the boundary area. The phenomenon shows that the filamentous object at the edge of the main object extends or scatters in the background during imaging. As a result, both a pixel of the filamentous object and a pixel of the background exist in the boundary area between the edge of the main object and the background. In other words, in the image, a filamentous object-type detail of the main object overlaps with the background. Overlapping between the main object and the background mostly occurs in an edge area between the main object and the background, or exists in a middle area of the main object. In an overlapping area, the filamentous object is extremely thin and occupies a relatively small quantity of pixels. Therefore, due to limitation of precision of semantic segmentation, the pixel of the filamentous object is erroneously determined as the background during image processing in the prior art. For example, an area of a filamentous object such as a hairline of a human body usually extends into a background and is located in a boundary area between a foreground and the background. During semantic segmentation, hair at an edge of a portrait is often erroneously determined as the background by an existing segmentation technology, and then the hair is blurred together with the background when image blur processing is performed. As a result, a hairline detail completely disappears after photographing blur, and quality of the portrait becomes worse, leading to a distorted and poor photographing effect.

SUMMARY

The present invention mainly resolves a problem of how to use a lightweight portable terminal, such as a mobile phone, to photograph an RGB image, and implement hair bundle-level/hairline-level segmentation to achieve a corresponding hair bundle-level/hairline-level effect of bokeh.

The present invention provides an image processing method and a related device, to precisely determine, from a color image, a "hairline-level" main body detail in a background, so that the "hairline-level" main body detail is not considered as the background for blurring when the background is blurred, which improves a blur processing effect.

According to a first aspect, an embodiment of the present invention provides an image processing method, including:
  obtaining a color image including a target portrait, where the color image includes a foreground and a background, and the target portrait corresponds to the foreground; determining a target hairline from the color image, where the target hairline includes a part in which a hairline of the target portrait overlaps with the background; and performing blur processing on the color image to obtain a target image, where the target hairline is blurred to a smaller degree than the background is blurred, and the target portrait is blurred to a smaller degree than the background is blurred.

According to a second aspect, an embodiment of the present invention provides an image processing apparatus, including: an image obtaining unit, configured to obtain a color image including a target portrait, where the color image includes a foreground and a background, and the target portrait corresponds to the foreground; a hairline determining unit, configured to determine a target hairline from the color image, where the target hairline includes a part in which a hairline of the target portrait overlaps with the background; and a blur processing unit, configured to perform blur processing on the color image to obtain a target image, where the target hairline is blurred to a smaller degree than the background is blurred, and the target portrait is blurred to a smaller degree than the background is blurred.

Generally, an application scenario of blur processing includes background blur. According to the method and the apparatus, a "hairline-level" portrait detail in the background can be precisely determined from the color image, so that a hairline in an overlapping area between the hairline and the background is not considered as the background for blurring when the background of a character is blurred. Therefore, a blur processing effect may be improved, and more details of a target main body may be highlighted, which achieves a purpose of a "super portrait".

According to the first aspect or the second aspect, in a possible design, before the obtaining a color image including a target portrait, the method further includes: receiving a target focus instruction, where the target focus instruction instructs to focus on the target portrait; or based on an instruction, entering a target photographing mode, in which the target portrait can be automatically focused. Accordingly, the apparatus further includes an instruction receiving unit, and this method step may be performed by the instruction receiving unit. Optionally, manual focus or automatic focus may be used as a condition for triggering the method.

According to the first aspect or the second aspect, in a possible design, before the obtaining a color image including a target portrait, the method further includes: entering a default or specific photographing mode, or inputting a background blur instruction when processing an image by using image software. The former operation may be applied to a picture photographing scenario, and the latter operation may be applied to picture photographing and image processing after a picture is photographed.

According to the first aspect or the second aspect, in a possible design, the performing blur processing on the color image to obtain a target image includes: obtaining a depth map corresponding to the color image; obtaining a bokeh image and a foreground probability map based on the depth map and the color image; increasing a probability that a pixel of the target hairline in the foreground probability map belongs to the foreground to obtain a target foreground probability map; and merging the bokeh image and the color image based on the target foreground probability map to obtain the target image. Accordingly, this step may be performed by the blur processing unit. The depth map of the color image may obtain more depth information by adjusting an aperture when a camera finds a view. The depth map of the color image may obtain depth information of a scenario by using a multi-camera photographing method or by using a depth camera (including a device such as a TOF or a structured light) to photograph the scenario.

According to the first aspect or the second aspect, in a possible design, various kinds of post-image processing, such as portrait and hairline enhancement, may be further performed on the bokeh image. This is not uniquely limited in this embodiment of the present invention.

In this process, the depth map includes depth information of each pixel in the color image, and the foreground probability map includes information about a probability that the pixel in the color image belongs to the foreground. Because the probability that the pixel of the target hairline in the target foreground probability map belongs to the foreground is increased, these hairlines identified from the background are blurred to a smaller degree or are not blurred in a merging process, which achieves a purpose of highlighting a portrait. This step may greatly reduce a blurring degree of the target hairline compared with the prior art.

According to the first aspect or the second aspect, in a possible design, the determining a target hairline from the color image includes: performing semantic segmentation on the color image to obtain a first mask area, where the first mask area includes a hairline appearing in the background and a portion of the background near the hairline appearing in the background; if an image corresponding to the first mask area has a strong texture, performing portrait segmentation on the color image by using a preset neural network to obtain a first portrait area, where the first portrait area corresponds to the target portrait, and the first portrait area includes the hairline appearing in the background; and determining the target hairline based on the first mask area and the first portrait area. Accordingly, this step may be performed by the hairline determining unit.

Optionally, before an algorithm, such as semantic segmentation or portrait segmentation, is used, the color image may be preprocessed to highlight a feature, so that an edge feature between a main object and the background is more obvious.

According to the first aspect or the second aspect, in a possible design, the determining a target hairline from the color image includes: performing semantic segmentation on the color image to obtain a first mask area, where the first mask area includes a hairline appearing in the background and a portion of the background near the hairline appearing in the background; if an image corresponding to the first mask area has a weak texture, performing portrait matting processing on the color image to obtain a first portrait area, where the first portrait area corresponds to the target portrait, and the first portrait area includes the hairline appearing in the background; and determining the target hairline based on the first mask area and the first portrait area. Accordingly, this step may be performed by the hairline determining unit. In this embodiment, when a scenario is simple, especially when texture information is simple, a matting algorithm has capability of precisely obtaining a hairline detail through segmentation with relatively little computation.

In the foregoing two possible design manners, a scenario of an image is perceived. Complexity is used to indicate a difficulty of distinguishing a detail from the color image, and the complexity may be determined by analyzing texture complexity of the overlapping area. Higher texture complexity of the overlapping area indicates higher complexity. After the difficulty of distinguishing a detail from the color image is determined, the difficulty may be used to guide how to obtain a portrait area through segmentation by using a better method, so as to more accurately determine the target hairline.

Generally, if the complexity is higher, a finer algorithm matching the complexity may be selected. For example, when a scenario is complex, a deep learning-type image segmentation algorithm is used, such as a fully convolutional network (FCN) algorithm. When a scenario is not complex, an algorithm other than the deep learning-type image segmentation algorithm may be used, for example, image segmentation algorithms including a matting algorithm, a graph cut algorithm, a superpixel segmentation algorithm, and a clustering algorithm.

More specifically, any of the foregoing possible technologies may be implemented by performing corresponding processing, such as algorithm implementation, signal obtaining, or image collection, by a processor by invoking a program and instructions that are stored in a memory.

According to a third aspect, an embodiment of the present invention provides an image processing method, including:
obtaining a color image including a target object, where the color image includes a foreground and a background, and the target object corresponds to the foreground;
determining a target filamentous detail from the color image, where the target filamentous object includes a part in which a filamentous object at an edge of the target object overlaps with the background; and
performing blur processing on the color image to obtain a target image, where the target filamentous object is blurred to a smaller degree than the background is blurred, and the target object is blurred to a smaller degree than the background is blurred.

According to a fourth aspect, an embodiment of the present invention provides an image processing apparatus, including: an image obtaining unit, configured to obtain a color image including a target object, where the color image includes a foreground and a background, and the target object corresponds to the foreground; a hairline determining unit, configured to determine a target filamentous object from the color image, where the target filamentous object includes a part in which a filamentous object at an edge of the target object overlaps with the background; and a blur processing unit, configured to perform blur processing on the color image to obtain a target image, where the target filamentous object is blurred to a smaller degree than the background is blurred, and the target object is blurred to a smaller degree than the background is blurred.

According to the method and the apparatus, a "filamentous object" detail of the target object in the background can be precisely determined from the color image, so that a filamentous object in an overlapping area between the filamentous object and the background is not blurred when the background is blurred. Therefore, an image blur processing effect may be improved, and more details of the target object may be highlighted.

According to the third aspect or the fourth aspect, in a possible design, before the obtaining a color image including a target object, the method further includes: receiving a target focus instruction, where the target focus instruction instructs to focus on the target object; or, based on an instruction, entering a target photographing mode based on an instruction, in which the target object can be automatically focused. Accordingly, the apparatus further includes an instruction receiving unit, and this method step may be performed by the instruction receiving unit. Optionally, manual focus or automatic focus may be used as a condition for triggering the method.

According to the third aspect or the fourth aspect, in a possible design, before the obtaining a color image including a target portrait, the method further includes: entering a default or specific photographing mode, or inputting a background blur instruction when processing an image by using image software. The former operation may be applied to a picture photographing scenario, and the latter operation may be applied to picture photographing and image processing after a picture is photographed.

According to the third aspect or the fourth aspect, in a possible design, the performing blur processing on the color image to obtain a target image includes: obtaining a depth map corresponding to the color image; obtaining a bokeh image and a foreground probability map based on the depth map and the color image; increasing a probability that a pixel of the target hairline in the foreground probability map belongs to the foreground to obtain a target foreground probability map; and merging the bokeh image and the color image based on the target foreground probability map to obtain the target image. Accordingly, this step may be performed by the blur processing unit. The depth map of the color image may obtain more depth information by adjusting an aperture when a camera finds a view. The depth map of the color image may obtain depth information of a scenario by using a multi-camera photographing method or by using a depth camera (including a device such as a TOF or a structured light) to photograph the scenario.

According to the third aspect or the fourth aspect, in a possible design, the determining a target filamentous object from the color image includes: performing semantic segmentation on the color image to obtain a first mask area, where the first mask area includes a filamentous object appearing in the background and a background near the filamentous object appearing in the background; if an image corresponding to the first mask area has a strong texture, performing main body-background segmentation on the color image by using a preset neural network to obtain a first target object area and a background, where the first target object area corresponds to the target object, and the first target object area includes the filamentous object appearing in the background; and determining the target filamentous object based on the first mask area and the first target object area. Accordingly, this step may be performed by the hairline determining unit.

According to the third aspect or the fourth aspect, in a possible design, the determining a target filamentous object from the color image includes: performing semantic segmentation on the color image to obtain a first mask area, where the first mask area includes a filamentous object appearing in the background and a background near the filamentous object appearing in the background; if an image corresponding to the first mask area has a weak texture, performing main body matting processing on the color image to obtain a first target object area and a background, where the first target object area corresponds to the target object, and the first target object area includes the filamentous object appearing in the background; and determining the target filamentous object based on the first mask area and the first target object area. Accordingly, this step may be performed by the hairline determining unit. In this embodiment, when a scenario is simple, especially when texture information is simple, a matting algorithm has capability of precisely obtaining a filamentous object detail through segmentation with little computation.

More specifically, any of the foregoing possible technologies may be implemented by performing corresponding processing, such as algorithm implementation, signal obtaining, or image collection, by a processor by invoking a program and instructions that are stored in a memory.

According to a fifth aspect, an embodiment of the present invention further provides an image detail processing method, including:
when a filamentous object of a main object overlaps with a background in an image, determining an overlapping area between the filamentous object and the background, where the overlapping area includes a pixel of the filamentous object and a pixel of the background;
determining the pixel of the filamentous object and the pixel of the background in the overlapping area; and
performing blur processing on the image, where the pixel of the filamentous object is blurred to a smaller degree than the pixel of the background is blurred.

According to the fifth aspect, in a possible design, whether the main object overlaps with the background in the image may be determined by a photographing system based on a specified identification algorithm. Corresponding determining may be triggered when a device receives an instruction indicating to perform, for example, background blur and local enhancement.

In this embodiment, for a means of obtaining an area in which the main object is located in the image, reference may be made to a manner using semantic segmentation or another means capable of obtaining the main object. In this embodiment, the main object may include only a main object, or include a main object and an area that overlaps with the main object and is difficult to distinguish, for example, an area in which a hairline overlaps with a background. In the overlapping area, both the hairline and the background exist. If this embodiment is applied to portrait photography, a portrait may be used as the main object, and a hairline may be used as a detail of the main object; and the background may be a monochromatic background, a complex scene, a work place, or the like. In this embodiment, a detail identification result is used to represent a pixel belonging to the main object in the overlapping area.

According to a sixth aspect, an embodiment of the present invention further provides an image detail processing apparatus. The apparatus includes:
a first determining module, configured to: when a filamentous object of a main object overlaps with a background in an image, determine an overlapping area between the filamentous object and the background, where the overlapping area includes a pixel of the filamentous object and a pixel of the background;
a second determining module, configured to determine the pixel of the filamentous object and the pixel of the background in the overlapping area; and
a blurring module, configured to perform blur processing on the image, where the pixel of the filamentous object is blurred to a smaller degree than the pixel of the background is blurred.

It should be understood that sub-steps in the fifth aspect and the sixth aspect may be implemented with reference to the foregoing related implementation methods.

According to a seventh aspect, an embodiment of the present invention further provides an image processing device, including: a memory, a processor, a bus, and a camera. The memory, the processor, and the camera are connected to each other by using the bus. The memory is configured to store a computer program and instructions. The camera is configured to collect an image. The processor is configured to control the camera to collect an image, is further configured to invoke the computer program and the instructions that are stored in the memory, and is configured to perform any possible design method and instance of the present invention.

According to the seventh aspect, in a possible design, the image processing device further includes an antenna system. The antenna system transmits and receives a wireless communication signal under control of the processor to implement wireless communication with a mobile communications network. The mobile communications network includes one or more of the following: a GSM network, a CDMA network, a 3G network, a 4G network, a 5G network, an FDMA network, a TDMA network, a PDC network, a TACS network, an AMPS network, a WCDMA network, a TDSCDMA network, a Wi-Fi network and an LTE network.

According to an eighth aspect, an embodiment of the present invention further provides a computer storage medium. The computer storage medium includes instructions. When the instructions are run on a hardware device, the hardware device is enabled to perform any possible design method and instance of the present invention.

According to a ninth aspect, an embodiment of the present invention provides a computer program product. The computer program product includes program instructions. When the computer program product is executed by a processor of a computing device, the processor performs any possible design method and instance of the present invention. The computer program product may be a software installation package. When a method provided in any foregoing possible design needs to be used, the computer program product may be downloaded and the computer program product may be executed on the processor, so that the corresponding method is implemented.

It should be understood that for a technical solution in any foregoing possible design, free combination of or mutual reference between solutions or steps may be made without departing from a law of nature.

BRIEF DESCRIPTION OF DRAWINGS

To describe the technical solutions in the embodiments of the present invention or in the background more clearly, the following briefly describes the accompanying drawings used in describing the embodiments of the present invention or the background.

DESCRIPTION OF EMBODIMENTS

The following describes the embodiments of the present invention with reference to the accompanying drawings in the embodiments of the present invention. Terms used in the embodiments of the present invention are merely used to explain specific embodiments of the present invention, and are not intended to limit the present invention. Apparently, the described embodiments are merely some but not all of the embodiments of the present invention. All other embodiments obtained by a person skilled in the art based on the embodiments of the present invention without making creative efforts shall fall within the protection scope of the present invention.

In the embodiments of the present invention, a terminal may be a device that provides video photographing and/or data connectivity to a user, a handheld device with a wireless connection function, or another processing device connected to a wireless modem, for example, a digital camera, a single-lens reflex camera, a mobile phone (or referred to as a "cellular" phone), or a smartphone; or may be a portable, pocket-sized, handheld, or wearable device (for example, a smart watch), a tablet computer, a personal computer (PC), a PDA (personal digital assistant), an in-vehicle computer, an unmanned aerial vehicle, an aerial filming drone, or the like.

Figure 1:
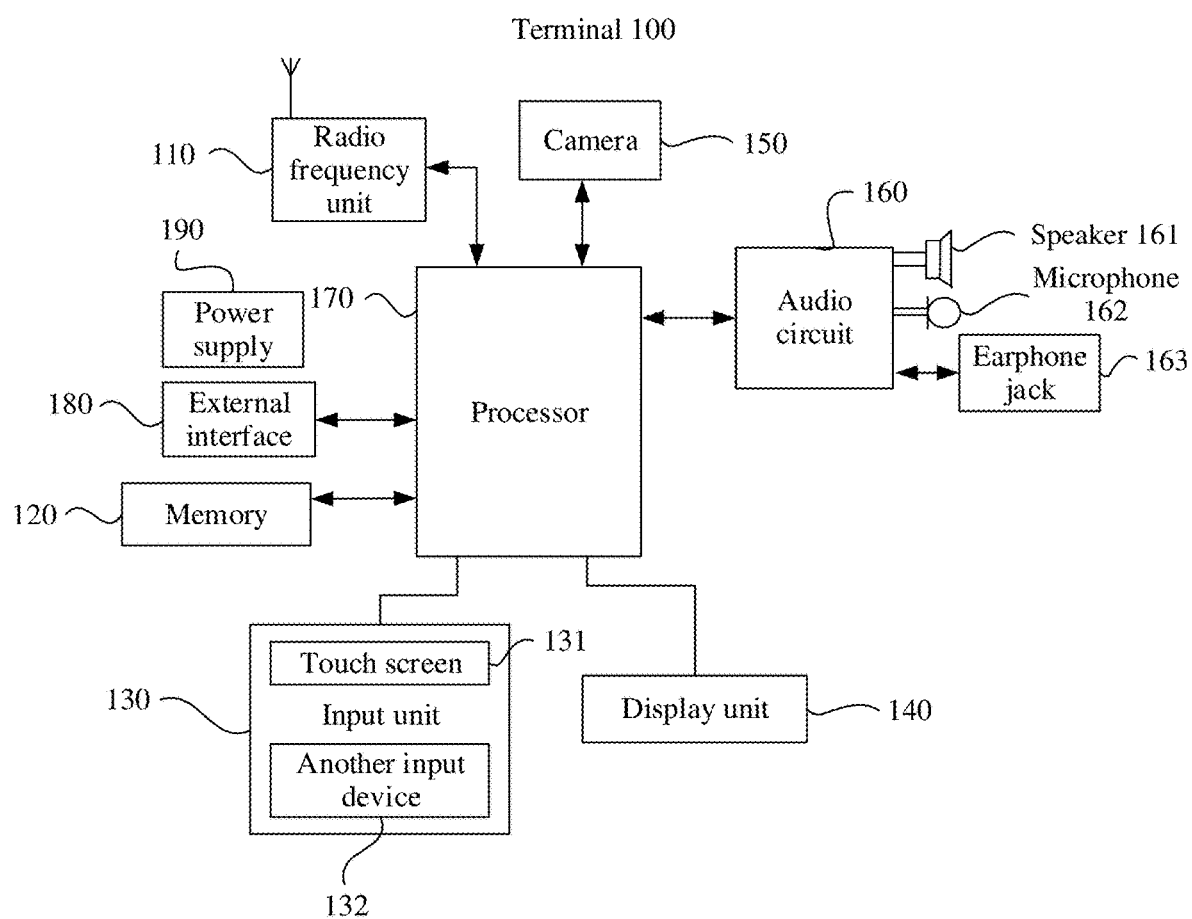
FIG. 1 is a schematic structural diagram of a terminal according to an embodiment of the present invention.

FIG. 1 is a schematic diagram of an optional hardware structure of a terminal 100.

Refer to FIG. 1. The terminal 100 may include components such as a radio frequency unit 110, a memory 120, an input unit 130, a display unit 140, a camera 150, an audio circuit 160 (including a speaker 161 and a microphone 162), a processor 170, an external interface 180, and a power supply 190. A person skilled in the art may understand that FIG. 1 is merely an example of an intelligent terminal or a multifunctional device and does not constitute a limitation on the intelligent terminal or the multifunctional device. The intelligent terminal or the multifunctional device may include more or fewer components than those shown in the figure, or combine some components, or have different components. For example, there is at least the memory 120, the processor 170, and the camera 150.

The camera 150 is configured to collect an image or a video, and may be enabled through triggering by an application instruction to implement a picture photographing or video photographing function, for example, obtain an image or a video in any scenario through photographing. The camera may include components such as an imaging lens, a light filter, and an image sensor. Lights emitted or reflected by an object enter the imaging lens, pass through the light filter, and finally converge on the image sensor. The imaging lens is mainly configured to converge lights emitted or reflected by all objects in a photographing angle of view (which may be referred to as to-be-photographed scenarios or target scenarios, or may be construed as scenario images that a user expects to photograph) to form an image. The light filter is mainly configured to filter out a redundant lightwave (for example a lightwave other than a visible light, like an infrared lightwave) in the light. The image sensor is mainly configured to: perform photoelectric conversion on a received optical signal to convert the received optical signal into an electrical signal, and input the electrical signal into the processor 170 for subsequent processing. The camera may be located in the front of the terminal device or on a back of the terminal device. A specific quantity and arrangement of cameras may be flexibly determined based on a requirement of a designer or a policy of a manufacturer. This is not limited in this application.

The input unit 130 may be configured to receive an input digit or character information, and generate a key signal input related to user setting and function control of the portable multifunctional device. Specifically, the input unit 130 may include a touchscreen 131 and/or other input devices 132. The touchscreen 131 may collect a touch operation performed by the user on or near the touchscreen (for example, an operation performed by a user on or near the touchscreen by using any suitable object, for example, a finger, a joint, or a stylus), and drive a corresponding connection apparatus based on a preset program. The touchscreen may detect a touch action performed by the user on the touchscreen, convert the touch action into a touch signal and send the touch signal to the processor 170, and can receive and execute a command sent from the processor 170. The touch signal includes at least contact coordinate information. The touchscreen 131 may provide an input interface and an output interface between the terminal 100 and a user. In addition, the touchscreen may be implemented in a variety of types such as resistive, capacitive, infrared, and surface acoustic wave. In addition to the touchscreen 131, the input unit 130 may include another input device. Specifically, other input devices 132 may include but are not limited to one or more of a physical keyboard, a function button (such as a volume control button or an on/off button), a trackball, a mouse, a joystick, and the like. Optionally, the touchscreen 131 may include two parts: a touch detection apparatus and a touch controller. The touch detection apparatus detects a touch direction of a user and detects a signal generated by a touch operation, and transmits the signal to the touch controller. The touch controller receives touch information from the touch detection apparatus, converts the touch information into a contact coordinate and then sends the contact coordinate to the processor 170, and can receive and execute a command sent from the processor 170.

The display unit 140 may be configured to: display information input by a user or information provided for a user, various menus of the terminal 100, and an interaction interface; display a file; and/or play any multimedia file; or may be configured to present an interface, so as to implement human-computer interaction. In this embodiment of the present invention, the display unit is further configured to display an image/a video obtained by using the camera 150 of the device, including preview images/videos in some photographing modes, photographed initial images/videos, and target images/videos that are processed by using a specific algorithm after being photographed.

Further, the touchscreen 131 may cover a display panel 141. After detecting a touch operation on or near the touchscreen, the touchscreen 131 transmits the touch operation to the processor 170 to determine a type of a touch event, and then the processor 170 provides a corresponding visual output on the display panel 141 based on the type of the touch event. In this embodiment, the touchscreen and the display unit may be integrated into one component to implement input, output, and display functions of the terminal 100. For ease of description, in this embodiment of the present invention, a touch display screen is used to represent a function set of the touchscreen and the display unit. In some embodiments, the touchscreen and the display unit may be two separate components. Optionally, the display panel 141 may be configured in a form of a liquid crystal display (LCD), an organic light-emitting diode (OLED), or the like. Further, the touchscreen 131 may cover the display panel 141. After detecting a touch operation on or near the touchscreen, the touchscreen 131 transmits the touch operation to the processor 170 to determine a type of a touch event, and then the processor 170 provides a corresponding visual output on the display panel 141 based on the type of the touch event.

The memory 120 may be configured to store instructions and data. The memory 120 may mainly include an instruction storage area and a data storage area. The data storage area may store various kinds of data such as a multimedia file and a text; and the instruction storage area may store software units such as an operating system, an application, and instructions required by at least one function, or subsets and extended sets thereof. The memory 120 may further include a non-volatile random access memory. The memory 120 provides functions for the processor 170, including managing hardware, software, and a data resource in a computing processing device, and supporting control software and an application. The memory 120 is further configured to store a multimedia file and store a running program and an application. Optionally, the memory 120 may mainly include a program storage area and a data storage area. The program storage area may store an operating system, various applications (such as a communication application), a related program or instructions in each method in the embodiments of the present invention, and the like. The data storage area may store data (for example, multimedia files such as various pictures and video files) created based on use of the terminal device. The memory 120 may include a high-speed random access memory, and may further include a non-volatile memory, for example, at least one magnetic disk storage device, a flash storage device, or another volatile solid-state storage device.

The processor 170 is a control center of the terminal 100, connects various parts of a whole mobile phone by using various interfaces and lines, and executes various functions of the terminal 100 and processes data by running or executing the instructions stored in the memory 120 and invoking the data stored in the memory 120, to entirely control the mobile phone. Optionally, the processor 170 may include one or more processing units. Optionally, the processor 170 may integrate an application processor and a modem processor. The application processor mainly processes an operating system, a user interface, an application, and the like, and the modem processor mainly processes wireless communication. It may be understood that the modem processor may not be integrated into the processor 170. In some embodiments, the processor and the memory may be implemented on a single chip. In some embodiments, the processor and the memory may be separately implemented on separate chips. The processor 170 may be further configured to: generate a corresponding operation control signal, send the corresponding operation control signal to a corresponding component of the computing processing device, and read and process data in software, especially read and process data and a program in the memory 120, so that functional modules in the terminal 100 execute corresponding functions, to control the corresponding component to act based on a requirement of instructions.

The radio frequency unit 110 may be configured to receive and send a signal in an information receiving and sending process or a call process. For example, after receiving downlink information of a base station, the radio frequency unit 110 sends the downlink information to the processor 170 for processing. In addition, the radio frequency unit 110 sends designed uplink data to the base station. Generally, an RF circuit includes but is not limited to an antenna, at least one amplifier, a transceiver, a coupler, a low noise amplifier (LNA), a duplexer, and the like. In addition, the radio frequency unit 110 may further communicate with a network device and another device through wireless communication. The wireless communication may use any communication standard or protocol, including but not limited to a global system for mobile communications (GSM), a general packet radio service (GPRS), code division multiple access (CDMA), wideband code division multiple access (WCDMA), long term evolution (LTE), an email, a short message service (SMS), and the like.

The audio circuit 160, the speaker 161, and the microphone 162 may provide an audio interface between a user and the terminal 100. The audio circuit 160 may convert received audio data into an electrical signal and transmit the electrical signal to the speaker 161. The speaker 161 converts the electrical signal into a sound signal for output. In another aspect, the microphone 162 is configured to collect a sound signal and may further convert the collected sound signal into an electrical signal. The audio circuit 160 receives the electrical signal, converts the electrical signal into audio data, and then outputs the audio data to the processor 170 for processing. The processor 170 further sends processed audio data to, for example, another terminal, by using the radio frequency unit 110, or outputs processed audio data to the memory 120 for further processing. The audio circuit may also include an earphone jack 163, configured to provide a connection interface between the audio circuit and an earphone. Specific quantities and arrangement of speakers and microphones may be flexibly determined based on a demand of a designer or a policy of a manufacturer. This is not limited in this application.

The terminal 100 further includes the power supply 190 (for example, a battery) that supplies power to the components. Optionally, the power supply may be logically connected to the processor 170 by using a power management system, so as to implement functions such as charging, discharging, and power consumption management by using the power management system.

The terminal 100 further includes the external interface 180. The external interface may be a standard Micro USB interface or a communication interface such as a multi-pin connector, may be configured to connect to the terminal 100 and another apparatus for physical connection and communication, and may also be configured to connect to a charger to charge the terminal 100. Optionally, the external interface 180 is connected to a communication interface of the another device by using a cable, to implement data transmission between the terminal device 100 and the another device.

Although not shown, the terminal 100 may further include a flash, a wireless fidelity (Wi-Fi) module, a Bluetooth module, sensors with different functions, and the like. A Wi-Fi technology is a short-distance wireless transmission technology. The terminal device 100 may be connected to an access point (AP) by using the Wi-Fi module, to access a data network. The Wi-Fi module 190 may be configured to receive and send data in a communication process. For example, when the terminal device 100 is a mobile phone, the terminal device 100 may include the radio frequency circuit 110, and may further include the Wi-Fi module. When the terminal device 100 is a computer, the terminal device 100 may include the external interface 180, and may further include the Wi-Fi module. When the terminal device 100 is a tablet computer, the terminal device 100 may include the Wi-Fi module. Other modules are not described herein in detail. Some or all of the methods described below may be applied to the terminal shown in FIG. 1.

Figure 2:
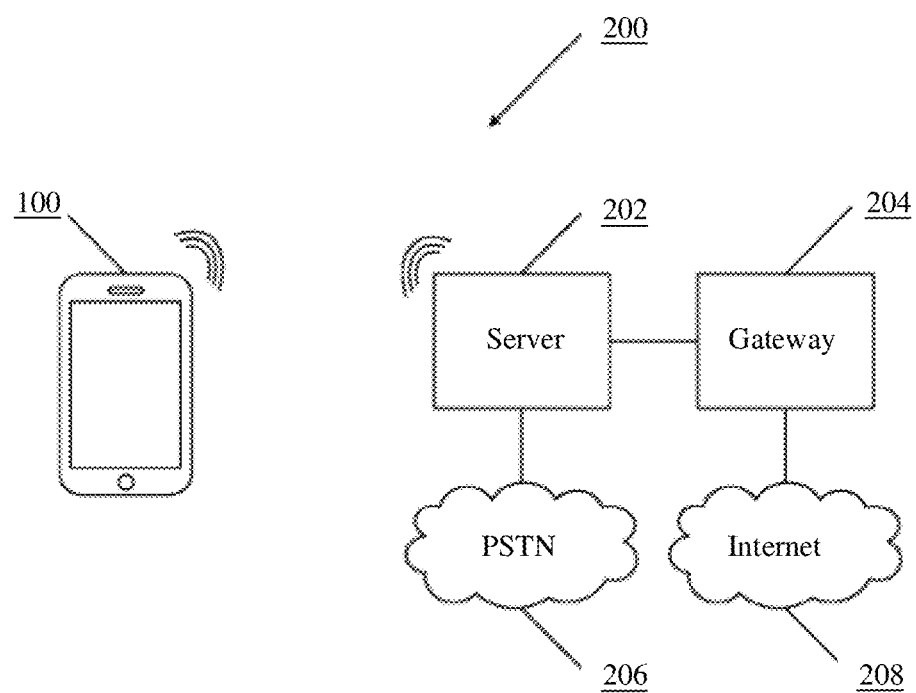
FIG. 2 is a schematic diagram of an example of an operating environment of a terminal system according to an embodiment of the present invention.
Figure 3:
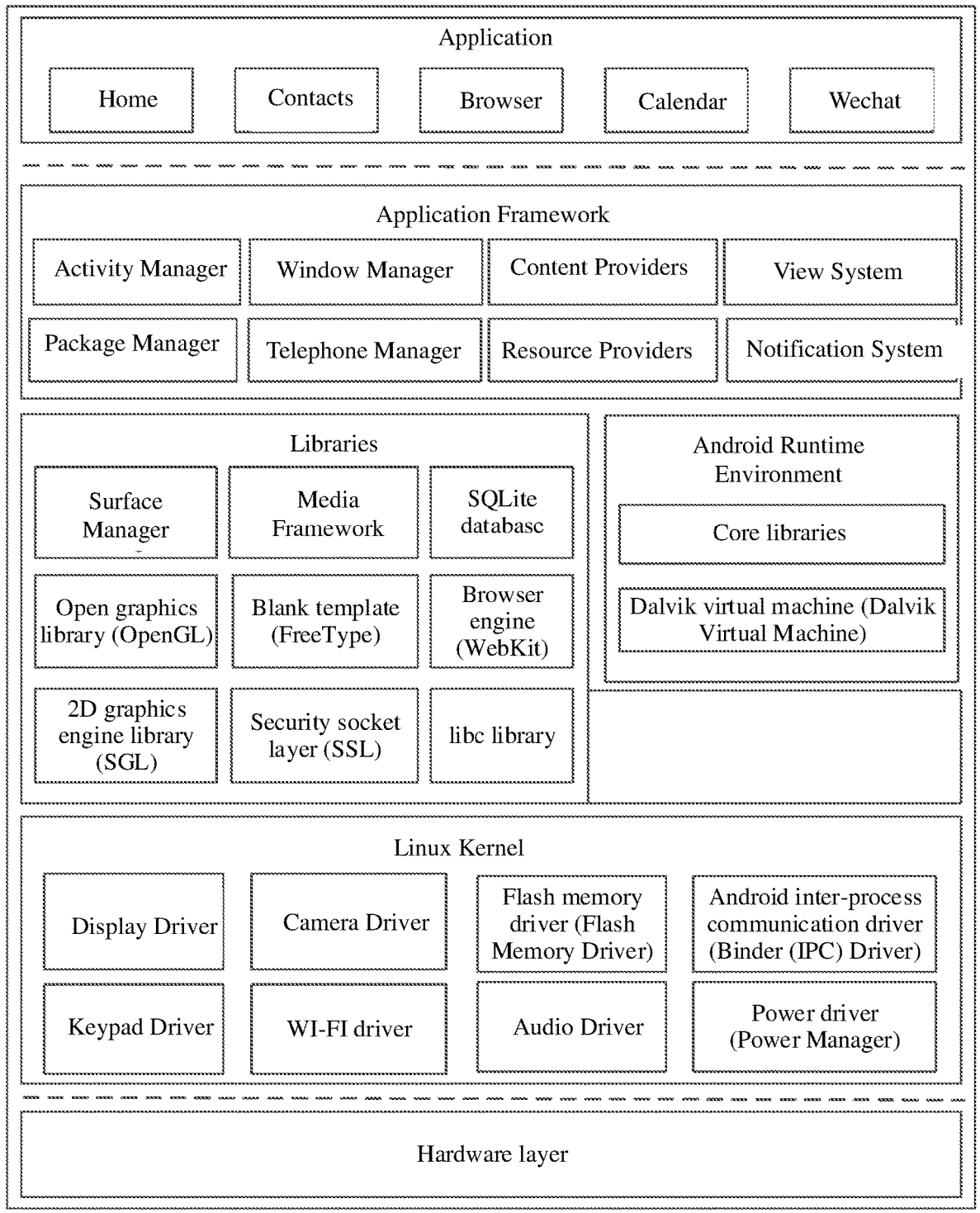
FIG. 3 is a schematic diagram of a terminal operating system according to an embodiment of the present invention.

FIG. 2 shows an example operating environment of a terminal system according to an embodiment of the present invention. The operating environment 200 may include a server 202, a gateway 204, a public switched telephone network (PSTN) 206, and/or another network such as the Internet 208, a cellular network, a satellite network, and/or an object similar to this. The terminal device 100 may use one or more operations of more than one described hardware and/or software component in the operating environment 200. The terminal device 100 may communicate with the server 202 by using a wireless and/or wired network. For example, the server 202 may be connected to the terminal device 100 in a wired manner and/or by using a wireless cellular network for communication. In addition, the server 202 may connect the terminal device 100 to the PSTN 206. This connection may enable the terminal device 100 to initiate and/or receive a telephone call. The server 202 may further connect the terminal device 100 to the gateway 204. This connection enables the terminal device 100 to access a wide area network, for example, the Internet 208. FIG. 1 shows a structural framework of the terminal device from a perspective of hardware composition. In FIG. 3, an example system framework of a software operating system related to a method in the embodiments of the present invention is described by using an example in which an operating system is an Android system on a mobile terminal. It should be noted that the method in the embodiments of the present invention may be applied to operating systems such as an Android system, an OS system, a Darwin system, an RTXC system, a Linux system, a Unix system, a Windows system, and an embedded operating system such as VxWorks.

Specifically, Android is an open-source mobile operating system. As a mobile device platform, a hierarchical structure of Android includes an operating system, a middle ware, and an application. As shown in FIG. 3, the Android operating system is divided into the following layers:

(1) Application Layer (Application)

A developer may develop an application based on an Android software development kit (SDK for short), and the operating system also includes some basic applications, for example, system-level applications such as a short message service message, a phone call, a photo viewer, and a web browser.

(2) Application Framework Layer (Application Framework)

The application framework layer of Android provides various application programming interfaces (APIs for short) for the application layer, and includes various controls required in a user interface (UI for short) program, for example, Views, including TextView (text control), ListView (list), Buttons, and WebView (web browser control).

(3) System Libraries and Runtime Environment Layer (Libraries and Android Runtime)

This layer includes two parts: various libraries and a runtime environment. The various libraries are mainly a C library, a multimedia library, a graphics processing engine, and the like. The runtime environment is mainly a Dalvik virtual machine. A difference between the Dalvik virtual machine and a standard JAVA virtual machine lies in that the Dalvik virtual machine executes a .dex file and is a virtual machine that is tailored and optimized for a mobile device.

(4) Linux Kernel Layer (Kernel)

Android is developed based on a Linux kernel, and a core system service, memory management, process management, a network protocol, and a drive of Android all rely on the Linux kernel. Under the Linux kernel layer, there is a hardware layer of a mobile phone that is described in FIG. 2.

The present invention may be applied to a terminal device having a photographing function, and a practical product form may be an intelligent terminal, for example, a product in which a camera is mounted, such as a mobile phone, a tablet, a DV, a video camera, a camera, a portable computer, a notebook computer, an intelligent robot, a television, a security protection system, or an unmanned aerial vehicle. Specifically, a functional module in the present invention may be deployed on a DSP chip of a related device, and may be specifically an application or software on the DSP chip. In the present invention, the functional module is deployed on the terminal device, and provides an image processing function through software installation or upgrading and through hardware invoking and coordination.

Figure 4A:
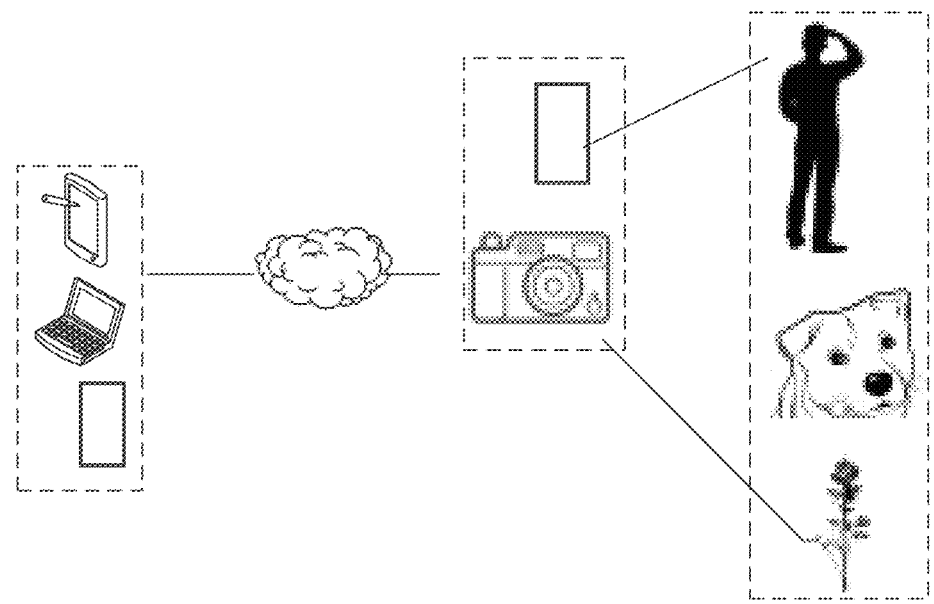
FIG. 4A, FIG. 4B, FIG. 4C, and FIG. 4D are schematic diagrams of application scenarios according to an embodiment of the present invention.

FIG. 4A is a schematic diagram of some possible application scenarios according to an embodiment of the present invention. In a rightmost dashed box, some main objects that are possibly photographed are shown, including a human, an animal, and a plant. These main objects may further include details such as a hairline and an accessory. These details belong to the main objects and may also appear in a background when an image is photographed. In a middle dashed box, devices configured to photograph the main object are shown, and the photographing devices may include various devices that have an image photographing function, such as a mobile phone and a camera. In addition, a video photographing device may be considered as a branch of the photographing device. For example, image processing in this embodiment may also be applied to processing on a single frame of image in a video image. In a left dashed box, devices having an image processing function are shown, including a mobile phone, a tablet computer, and a notebook computer. An image detail processing method provided in an embodiment of the present invention may be applied to the device in the left dashed box, or may be applied to the device in the middle dashed box.

Figure 4B:
Figure 4C:
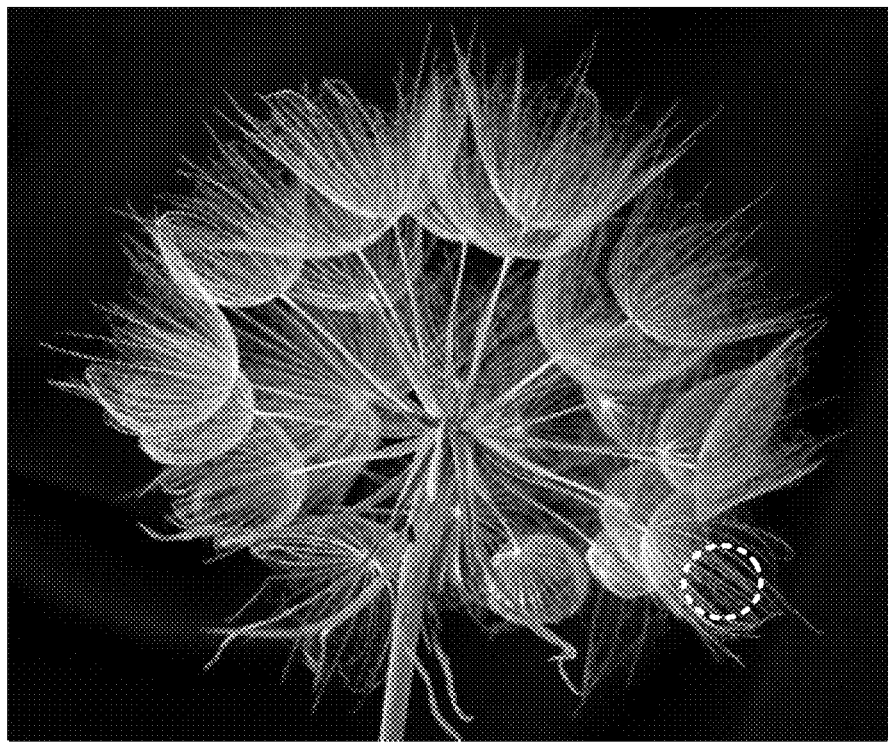
Figure 4D:

Specifically, refer to FIG. 4B, FIG. 4C, and FIG. 4D. FIG. 4B, FIG. 4C, and FIG. 4D show several application scenarios in which overlapping details exist between possible main objects and backgrounds. In FIG. 4B, FIG. 4C, and FIG. 4D, dashed areas show overlapping cases between the main objects and the backgrounds, and the shown dashed areas are merely parts of but not complete overlapping areas. In addition, images in interfaces in FIG. 4B, FIG. 4C, and FIG. 4D may be color images or monochromatic images in practical application. It should be understood that overlapping between a main body and a background in this application refers to overlapping between the main object and the background in an imaging area during imaging.

Specifically, the image shown in FIG. 4B may indicate that a portrait is used as a main object, that is, the portrait is used as a foreground of the entire image. An area other than the portrait in the image may be understood as a background, and the dashed box may represent a partial overlapping area between the main object/foreground and the background. For example, although some hairlines of a person belong to a portrait main body, the hairlines overlap with the background during imaging. Accordingly, not all pixels in the overlapping area are pixels of the hairlines, and there are some pixels of the background. It should be understood that the overlapping area in the image is merely an example, and a size and a shape are not limited.

Specifically, the image shown in FIG. 4C may indicate that a dandelion is used as a main object, that is, the dandelion is used as a foreground of the entire image. A black part in the image is a background, and a circular dashed area at a lower right location on the image represents an overlapping area between the main object/the foreground and the background. It can be learned that there are a plurality of areas in which the dandelion overlaps with the background. During imaging, fine fluff of the dandelion overlaps with the background. Accordingly, not all pixels in the overlapping area are pixels of dandelion fluff, and there are some pixels of the background. It should be understood that the overlapping area in the image is merely an example, and a size and a shape are not limited.

Specifically, the image shown in FIG. 4D may indicate that an animal is a main object, that is, the animal is used as a foreground of the entire image. An area in the image other than the animal may be understood as a background, and the dashed box may represent an overlapping area between the main object/the foreground and the background. For example, hair at an edge of a main body of the animal overlaps with the background. Accordingly, not all pixels in the overlapping area are of the hair of the animal, and there are some pixels of the background. It should be understood that the overlapping area in the image is merely an example, and a size and a shape are not limited.

It should be understood that a case in which an overlapping area exists between a detail of a main object and a background mostly occurs near a boundary of the main object. The boundary may include an external boundary, an internal boundary, or a middle hollow-out boundary of the main object. As shown in FIG. 4B and FIG. 4D, internal areas of the main objects all belong to the main objects, and edges of the main objects overlap with the backgrounds, or an overlapping area may exist in a middle area of the main object, as shown in FIG. 4C, a case in which the overlapping area exists mostly occurs in a main object with a hollow-out and transparent effect. According to the dandelion in FIG. 4C, a case in which the main object overlaps with a middle area also exists at an edge of the main object. In addition, it can be further learned that FIG. 4C is a case with a simple background texture, and FIG. 4B and FIG. 4D are cases with more complex textures.

The present invention may be applied to two image processing scenarios: one is instant photographing and the other is post-image processing.

Instant Photographing

Figure 5A:
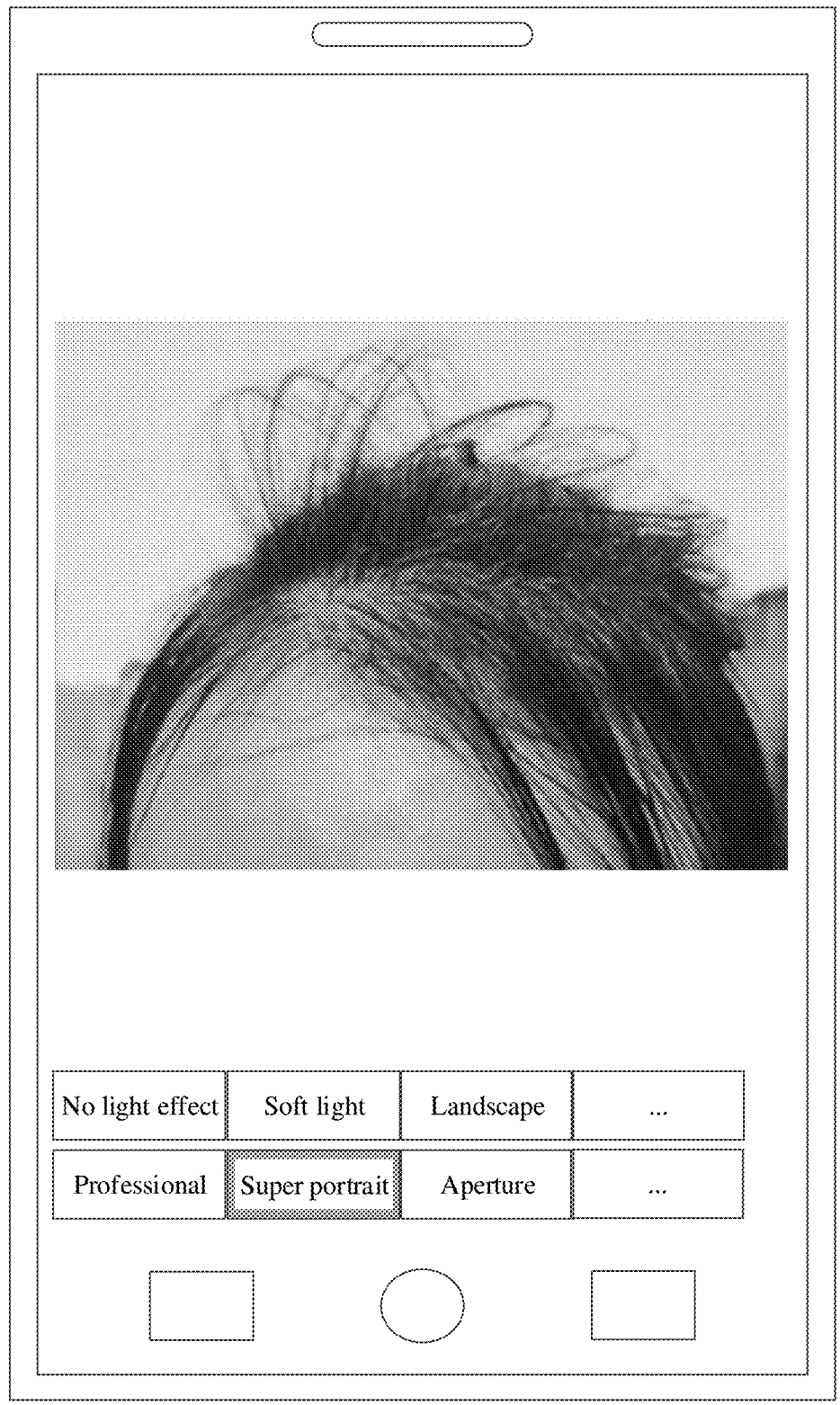
FIG. 5A, FIG. 5B, and FIG. 5C are schematic diagrams of a terminal application operation interface according to an embodiment of the present invention.

Optionally, FIG. 5A is a schematic diagram of a possible terminal operation interface. When a user uses a mobile phone to perform instant photographing, a camera first obtains a color image. If the user chooses a specific mode when performing photographing, for example, a "super portrait" mode (which is merely an example and is not limited), a terminal can perform automatic focus to determine a target main body (for example, a portrait) and perform the method in the embodiments of the present invention, and directly display a captured picture in which "a target main body is highlighted and a background is blurred".

Figure 5B:
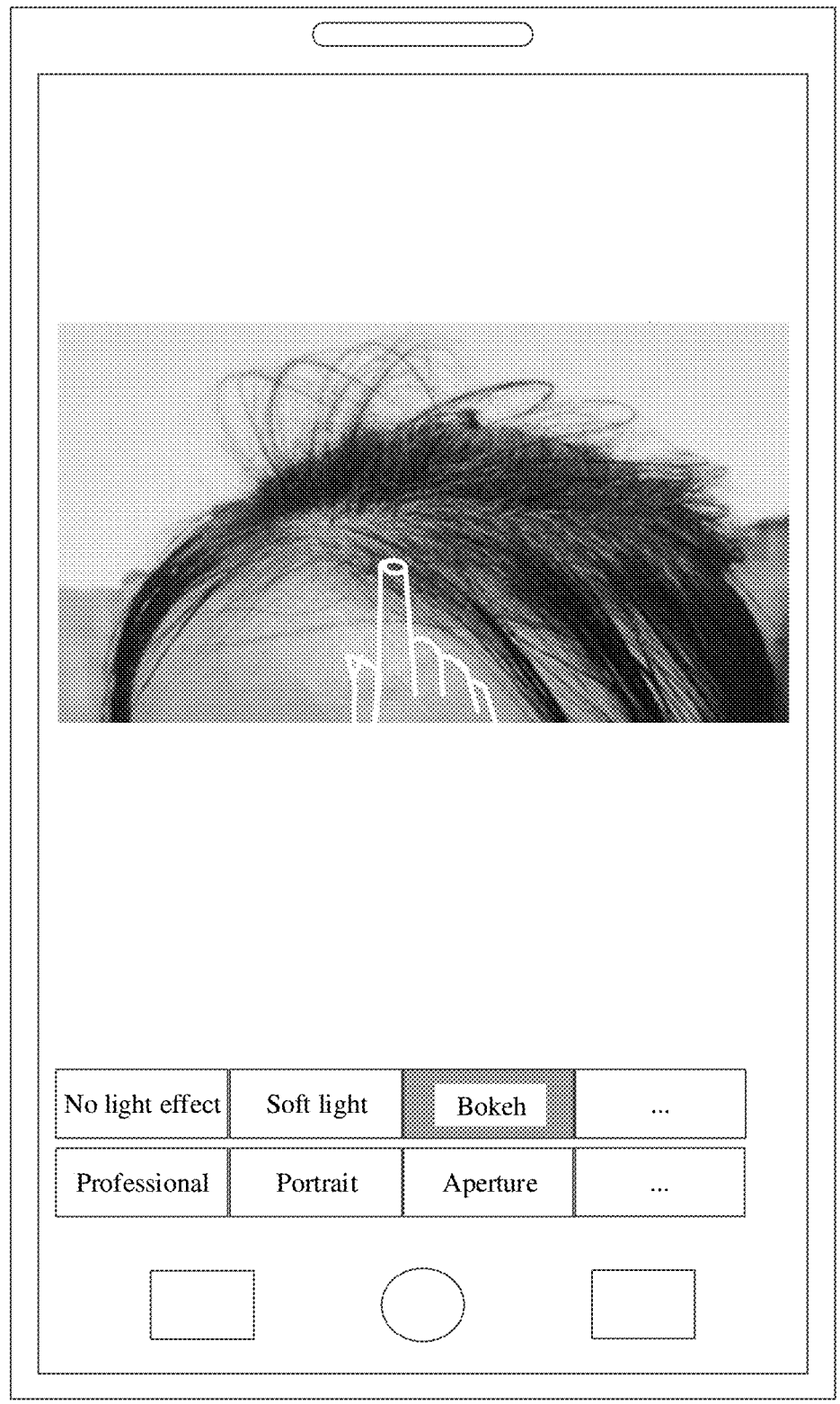

Optionally, FIG. 5B is a schematic diagram of a possible terminal operation interface. After entering a photographing interface, a user focuses on a portrait and selects a background blur function. After obtaining an original color image of portrait photography, a terminal may display an image in which a background is blurred in the interface. In other words, a preview image before photographing can display a picture in which "a target main body is highlighted and a background is blurred".

Figure 5C:
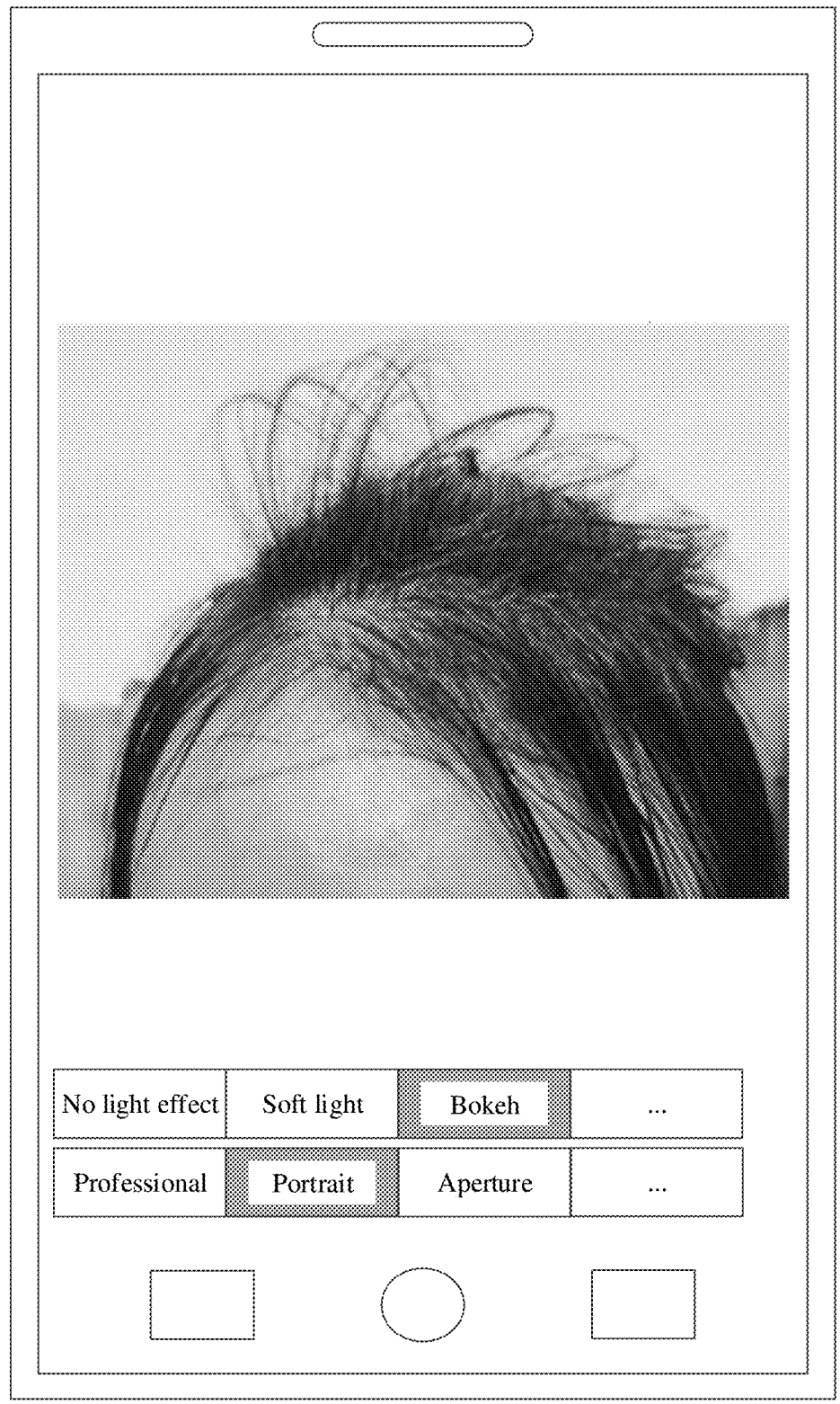

Optionally, FIG. 5C is a schematic diagram of a possible terminal operation interface. After entering a photographing interface, a user selects a portrait photography function and then selects a background blur function. After obtaining an original color image of portrait photography through photographing, a mobile phone may display, in the interface, an image in which a background is blurred. In other words, a preview image before photographing can display a picture in which "a target main body is highlighted and a background is blurred". As examples of possible operation scenarios, FIG. 5A, FIG. 5B, and FIG. 5C should not be understood as a limitation on a photographing function interface, a background blur menu location, and the like of a mobile phone.

Post-Processing

The post-processing described in this embodiment of the present invention may refer to post-processing on a captured image. For example, a photographed original image is used or a local image is invoked to perform processing of "background blur and main object effect enhancement", and the like in an application such as a camera. Alternatively, an original image or an image processed by a camera is transmitted to another device, and processing of "background blur and main object effect enhancement", and the like are performed in the another device.

An image processing method of the present invention is described below in detail by using examples.

Example 1—Photograph a Portrait and Present a Clear Hairline

This embodiment may occur in a process in which a user performs photographing in real time, or in some post-image processing processes.

Optionally, for example, a user photographs a portrait. When the user performs photographing, a terminal may receive a focus instruction of the user. In a preview image of photographing, a focusing location corresponds to a to-be-photographed target portrait, and the following steps S1 to S3 can be performed when a real-time photographing preview image is generated or when an image is captured. Alternatively, a terminal enters a target photographing mode based on selection of the user or based on a default manner. The target photographing mode can automatically focus on a to-be-photographed person, and the following steps S1 to S3 can be performed when a preview image is generated or when an image is captured.

Optionally, the user may further use specific software to process an image, and input specific instructions or perform operations when processing the image to enable the terminal to perform the following steps S1 to S3.

In a preview image or a displayed captured image, "a portrait is highlighted, a background is blurred, and a hairline appearing in the background is not blurred together with the background", which achieves a "super portrait effect".

Figure 6A:
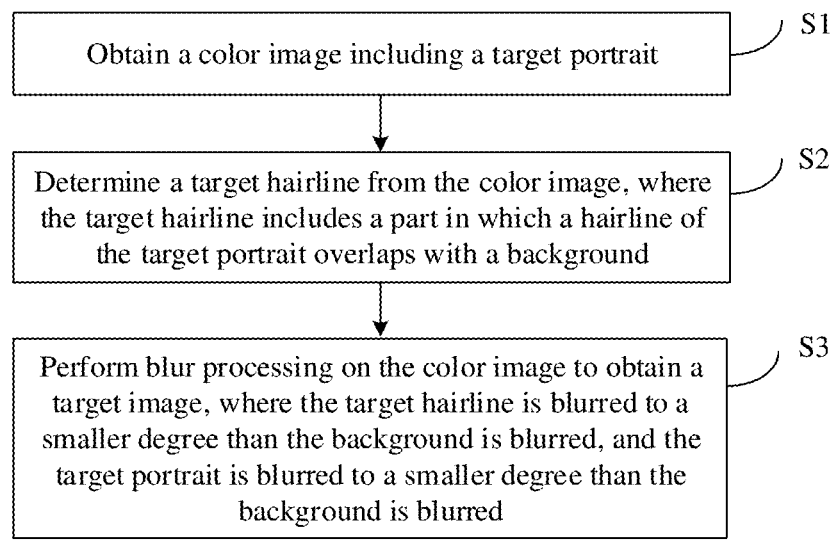
FIG. 6A is a schematic flowchart of an image processing method according to an embodiment of the present invention.

FIG. 6A shows an image processing method according to an embodiment of the present invention. The method includes the following steps S1 to S3.

S1: Obtain a color image including a target portrait, where the color image includes a foreground and a background, and the target portrait corresponds to the foreground.

The target portrait is a main object to be highlighted during imaging.

Optionally, if a plurality of characters exist in an image, a character corresponding to a focus instruction is a target portrait.

Specifically, a user may trigger a terminal to collect an RGB image after entering a photographing function, as shown in FIG. 5A, FIG. 5B, FIG. 5C, or another method.

In addition, obtaining an image may further refer to that the terminal obtains an RGB image locally or from another device, for example, the terminal downloads the RGB image from a network side or reads the RGB image from a local memory of a device. The user inputs operation instructions to implement a post-processing function of blurring a portrait background.

In this embodiment, the color image includes but is not limited to a color image of any format, such as a joint photographic experts group (jpg) format or a bitmap (bmp) format.

It should be understood that in addition to being applied to an RGB color image, the present invention may be applied to a monochromatic color image, a black-and-white image, and the like, for example, images such as a greyscale image and a red image.

An image may have a plurality of backgrounds, for example, a background with a simple texture and a background with a complex texture. The background with a simple texture includes but is not limited to a monochromatic background, more specifically, an identification photo for example. The background with a complex texture includes but is not limited to a background in a complex scenario such as natural scenery, an animal or a plant, or a work place.

S2: Determine a target hairline from the color image, where the target hairline includes a part in which a hairline of the target portrait overlaps with the background.

Figure 6B:
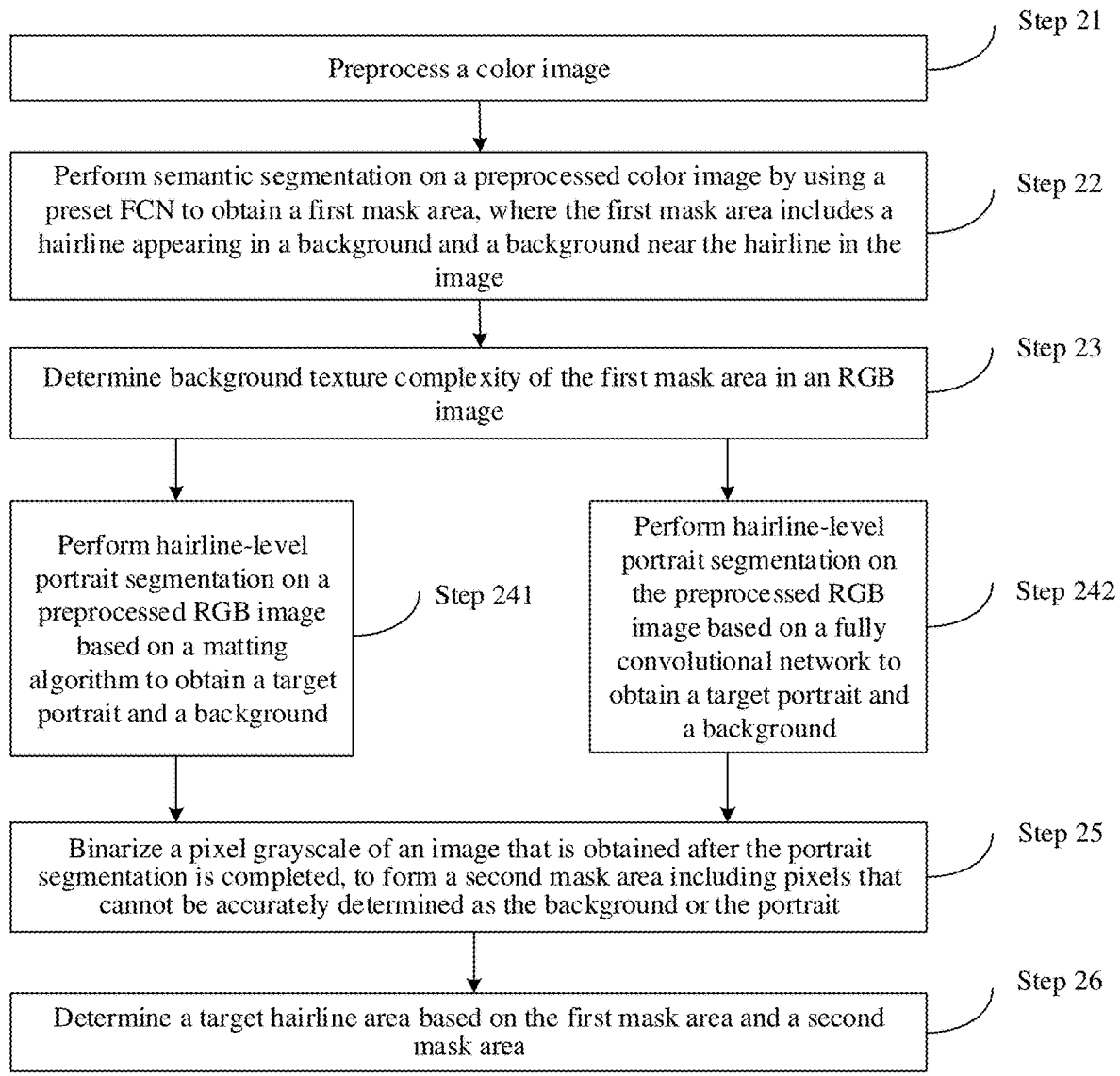
FIG. 6B is a schematic flowchart of a method for determining a target hairline area according to an embodiment of the present invention.

Optionally, S2 may include the following steps (step 21 to step 26), and reference may be made to FIG. 6B.

Step 21: Perform image preprocessing such as image enhancement or normalization. Image preprocessing is a mature prior art, and details are not described in this embodiment. Preprocessing may enhance a feature of the color image, so that an edge feature between the main object and the background is more obvious, which improves accuracy of segmentation or analysis for an obtained image. An image may be segmented more accurately during semantic analysis. For example, interference of a part of the background to a hairline detail may be filtered out by performing preprocessing on a character image, so that the hairline detail is more highlighted.

Step 22: For a preprocessed color image, perform semantic segmentation by using a preset fully convolutional network (FCN) to obtain a first mask area (mask 1). A mask area in the present invention may also be referred to as an envelope mask. The first mask area corresponds to an envelope of a "hairline area", and naturally includes a hairline (for example, a hairline that is at an edge of a head portrait and that appears in the background) appearing in the background and a background near the hairline in the image. In other words, the first mask area includes a hairline of the character that overlaps with the background. The first mask area is shown as a white area in FIG. 7A.

Figure 7A:
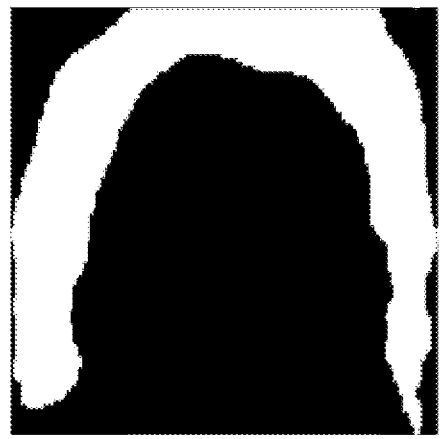
FIG. 7A is a schematic diagram of a mask obtained after hairline area segmentation according to an embodiment of the present invention.

FIG. 7A may represent a binary image obtained after semantic segmentation. A black part represents a "non-hairline area". A pixel in the "non-hairline area" is either located in a non-hairline area of a target character or located in the background. For example, a middle black area corresponds to a non-hairline area of a portrait, a peripheral black area corresponds to a background area, and a grayscale value of each pixel in the area may be represented by N1. The white area represents a "hairline area", and a grayscale value of each pixel in the area may be represented by N2. N1 is unequal to N2. Optionally, N1 is 0 and N2 is 255. Values of N1 and N2 are not limited in this embodiment, and any pair of unequal numbers may be used.

It may be understood that the "hairline area" almost includes most hairlines or even all hairlines in the portrait.

In this step, an overall hairline area may be determined. However, a micron-size hairline cannot be determined precisely.

Step 23: Based on a preprocessed RGB image obtained in step 21 and the mask 1 obtained in step 22, determine, from the preprocessed RGB image, an RGB image in an area corresponding to the mask 1, and perform scenario understanding on the RGB image in the area corresponding to the mask 1.

In a specific process, complexity of texture information (such as an image contrast and an image gradient) of the RGB image in the area corresponding to the mask 1 is determined and classified.

More specifically, it may be understood as follows: a background in the RGB image in the area corresponding to the mask 1 is analyzed to determine whether this part of background has a strong texture or a weak texture. The strong texture indicates that image complexity is relatively high, for example, image complexity of a scenario with messy content, such as a shrubland or a grove. The weak texture indicates that image complexity is relatively low, for example, image complexity of a scenario with relatively simple content, such as the sky, a white wall, or a desert. If this part of background has the weak texture, step 241 or step 242 may be performed; or if this part of background has the strong texture, step 242 may be performed.

Step 241: Perform, based on a matting algorithm, "hairline-level" portrait segmentation on the preprocessed RGB image obtained in step 21 to obtain a target portrait area (a first portrait area) and a background area. The target portrait area may be shown as a white area in FIG. 7B, the white area corresponds to a main body of a portrait, and a black part corresponds to a background. The black part indicates that any pixel in the area definitely belongs to a background, and each pixel in the black part may be represented by N3. The white area indicates that any pixel in the area may belong to a portrait. A grayscale value of each pixel may be represented by any value in (N3, N4] or [N4, N3). A value closer to N4 indicates a higher probability that the pixel belongs to the portrait. If the value is N4, it indicates that the pixel is definitely a pixel of the main body of the portrait. Optionally, N3 is less than N4, N3 is 0, and N4 is 255. It should be understood that specific values of N3 and N4 and a value relationship between N3 and N4 are not limited in this embodiment, and any pair of unequal numbers may be used.

Figure 7B:
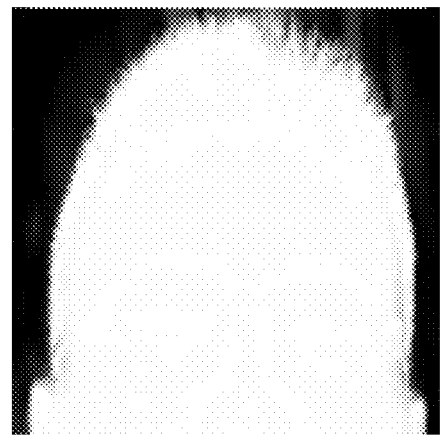
FIG. 7B is a schematic diagram of portrait segmentation according to an embodiment of the present invention.

Step 242: Perform, by using a fully convolutional network (FCN) algorithm, hairline-level portrait segmentation on the preprocessed RGB image obtained in the step 21 to obtain a target portrait area (a first portrait area) and a background area, where the target portrait area includes the hairline appearing in the background. The target portrait area may be shown as the white area in FIG. 7B. FIG. 7B may represent a probability image obtained through processing by a fully convolutional network/neural network, the white area corresponds to a main body of a portrait, and the black part corresponds to a background. The black part indicates that any pixel in the area definitely belongs to a background, and a grayscale value of each pixel in the black part may be represented by N3. The white area indicates that any pixel in the area may belong to a portrait. Each pixel in the white area may be represented by any value in (N3, N4] or [N4, N3). A value closer to N4 indicates a higher probability that the pixel belongs to a portrait. If the value is N4, it indicates that the pixel is definitely a pixel of the portrait. Optionally, N3 is less than N4, N3 is 0, and N4 is 255. It should be understood that specific values of N3 and N4 and a value relationship between N3 and N4 are not limited in this embodiment, and any pair of unequal numbers may be used.

It can be learned from step 241 and step 242 that in an optional implementation, this embodiment provides a solution of how to segment a portrait and a background based on background texture complexity in a hairline area. Generally, if the complexity is higher, a finer algorithm matching the complexity may be selected. When a scenario is not complex, an algorithm other than a deep learning-type algorithm may be used, for example, image segmentation algorithms including a matting algorithm, a graph cut algorithm, a superpixel segmentation algorithm, a clustering algorithm, and the like. In addition, texture complexity may also be different in different areas of an image. Therefore, three optional implementations may be included:

In a first case, if texture complexity in an entire background area in a hairline area is not significantly different, portrait segmentation may be performed on an entire image based on only step 241 or based on only step 242.

In a second case, if a part of a background area in a hairline area has a complex texture and a part of the background area has a simple texture, overall evaluation may be performed on background complexity of the entire hairline area, and portrait segmentation may be performed by selectively performing step 241 or step 242 based on an overall complexity evaluation result.

In a third case, if a part of a background area in a hairline area has a complex texture and a part of the background area has a simple texture, image segmentation may be performed by using corresponding matching algorithms in different areas, and then splicing is performed to obtain a portrait and a background.

Optionally, an FCN training method is briefly described as follows.

(1) A mask with a same size as an RGB image is generated. A manner for generating the mask is as follows: For any pixel in the RGB image, it is determined whether this pixel belongs to a portrait area. If this pixel belongs to the portrait area, a value of a corresponding pixel in the mask is set to 1; or if this pixel does not belong to the portrait area, a value of a corresponding pixel in the mask is set to 0. Then lengths and widths of all color images are all zoomed to 640×480, and finally, sizes of masks are all zoomed to 80×60.

(2) A quantity of layers of a convolutional neural network is set to nine. Specifically, a first layer is an input layer and receives an RGB image with a size of 640×480 as an input. A second layer is a convolutional layer and includes 32 feature mapping images with a size of 320×240, a size of a used convolution kernel is 5×5, and a sampling interval is 2. A third layer is a downsampling layer, a neighborhood of 2×2 in the second layer is downsampled as a pixel, and a sampling interval is 2. A fourth layer includes 64 feature mapping images of 160×120. A fifth layer is a convolutional layer and includes 64 feature mapping images with a size of 160×120. A sixth layer is a downsampling layer, a neighborhood of 2×2 in the fifth layer is downsampled as a pixel, and a sampling interval is 2. A seventh layer includes 128 feature mapping images of 80×60. An eighth layer is a convolutional layer and includes 256 feature mapping images with a size of 80×60. A ninth layer is an output layer and includes one binary mask with a size of 80×60.

A method for obtaining the ninth layer of the convolutional neural network is specifically as follows: A logistic regression model is trained for each pixel on the mask of 80×60, and whether each pixel belongs to a human body area or a non-human body area is predicted by using the logistic regression model.

A method for training the logistic regression model is specifically described as follows: A 257-dimensional logistic regression model is trained by using pixels at same locations on the 256 feature mapping images in the eighth layer as inputs of a logistic regression. A label of the logistic regression model is a value of a corresponding pixel on the mask. When it is predicted whether a pixel belongs to the human body area or the non-human body area, if an output of the logistic regression model corresponding to a specific pixel is greater than 0.5, this pixel is determined as a human body area pixel, and a value of this pixel is set to 1; or if an output of the logistic regression model corresponding to a specific pixel is not greater than 0.5, this pixel is determined as a background pixel, and a value of this pixel is set to 0.

The foregoing is used as an example, a specific value of an image resolution, setting of a quantity of layers of the convolutional neural network, a size value of each layer, and a training sample may be set based on a requirement. This is not limited in this embodiment of the present invention.

Step 25: Binarize a pixel grayscale of the entire image based on a portrait segmentation result obtained in step 241 or step 242. A specific operation is as follows: Grayscale values of pixels falling within (N3, N4) are all modified to N6. These pixels theoretically belong to an uncertain area, in other words, it is not sure that these pixels are definitely a background or a portrait. In actual content, this part basically corresponds to an overlapping area between a portrait boundary and the background in the image, and basically includes a hairline or another detail of the portrait that overlaps with the background. Therefore, a pixel that cannot be accurately determined as the background or the portrait may be logically labeled as "hairline", in other words, these pixels in which a hairline overlaps with the background are logically labeled as "hairline". It should be understood that these pixels are not actual hairline pixels, and the action is theoretical hypothesis logic. In addition, specifically, grayscale values of pixels equal to N3 or N4 are all modified to N5, in other words, a pixel determined as the portrait and a pixel determined as the background are logically labeled as "not hairline". It should be understood that the action is a hypothetical logical assignment rather than a change of actual content. After binarization, an area that includes all pixels labeled as N6 may represent another logical "hairline area", that is, a second mask area (mask 2).

Optionally, the mask 2 may be further expanded. If several pixels that are "not hairline" around the pixels labeled as N6 are modified from N5 to N6, a new area that includes all pixels represented by N6 may represent another logical "hairline area", that is, a third mask area (mask 3).

Optionally, N5 is less than N6, N5 is 0, and N6 is 255. Values of N5 and N6 are not limited in this embodiment, and any pair of unequal numbers may be used. It should be understood that the mask 2 or the mask 3 is obtained to more accurately determine a real hairline area in which the portrait overlaps with the background.

Step 26: Perform an AND logical operation on pixels at a same location on the mask 1 obtained in step 22 and the mask 2 or the mask 3 obtained in step 25 and get an intersection to obtain a target hairline area (mask 4). Compared with the mask 1, the mask 2, or the mask 3 obtained previously, the mask 4 more precisely corresponds to a hairline of the portrait that overlaps with the background.

Using the mask 3 to obtain the mask 4 may logically label, as the foreground, a real hairline pixel and a relatively small quantity of background pixels around the hairline in the image. Therefore, after the image is blurred subsequently, the background pixel around the hairline may also be blurred to a relatively small degree, and the hairline pixel is blurred to a smaller degree or is not blurred. Therefore, transition between the filamentous object and the background is more natural, and more filamentous object details are reserved.

Regardless of values of N1, N2, N3, N4, N5, and N6, logical meanings of N1, N2, N3, N4, N5, and N6 are "true" or "false" (for example, N1, N3, and N5 represent "false", and N2, N4, and N6 represent "true") in a logical operation. N1, N2, N3, N4, N5, and N6 each are used to represent a value of a pixel grayscale or a probability.

Figure 7C:
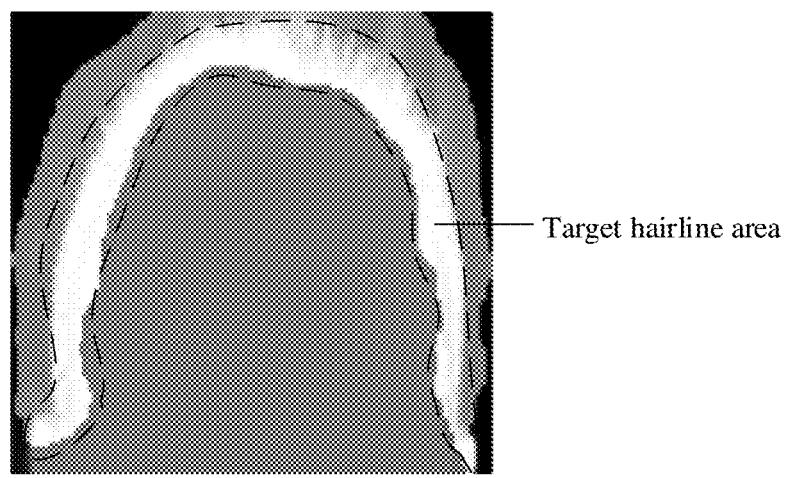
FIG. 7C is a schematic diagram of determining an image area for a target hairline according to an embodiment of the present invention.

For ease of description, it is assumed that N1, N3, and N5 are all 0, corresponding to a logical meaning "false", and that N2, N4, and N6 are all 255, corresponding to a logical meaning "true". When the AND logical operation is performed on pixels at any same location on the mask 1 and the mask 2 or the mask 3, it is determined as "true" when grayscale values of the pixels are also 255, that is, the pixels are indeed "hairline pixels" in terms of logics. An area that includes all pixels whose AND operation results are "true" in the entire image is the target hairline area, and the target hairline area corresponds to the target hairline in image content. As shown in FIG. 7C, for example, an area in a black dashed box corresponds to the target hairline area (it should be understood that the dashed area is merely a general illustration and does not constitute any limitation).

It should be understood that the target hairline may roughly correspond to a hairline in the overlapping area, and the target hairline belongs to the portrait and also appears in the background. Because a morphological expression of the hairline is extremely complex, corresponding content of the target hairline in the image may be all hairlines in the background, or may be some hairlines in the background, and the target hairline may also include all or some hairlines that spread to a human face. It should be understood by a person skilled in the art that scenarios of the present invention are quite abundant, and the present invention constitute no limitation on a location or an expression form of the target hairline.

It should be further understood that the logical operation in step 22 to step 26 is merely an optional method among numerous implementation methods for determining the target hairline. Because of diversity of a portrait and background segmentation manner, a logical true/false expression manner, and a logical operation manner, methods and expressions that can be combined in the field are more diverse, which cannot be described in an exhaustive manner in this embodiment of the present invention. In conclusion, no matter which manner is used, a method should belong to an implementation method and the protection scope of the present invention, provided that the method can be used to determine, from an image, a detail (for example, hair) of a main object that overlaps with a background.

S3: Perform blur processing on the color image to obtain a target image, where the target hairline is blurred to a smaller degree than the background is blurred, and the target portrait is blurred to a smaller degree than the background is blurred. It should be understood that the target hair or the target portrait may be blurred to a degree of 0, that is, the target hair or the target portrait is not blurred.

In addition, it should be understood by a person skilled in the art that in an expression similar to "a first area is blurred to a smaller degree than a second area is blurred", the first area and the second area refer to an overall concept rather than a limitation on a specific pixel or all pixels in the first area or the second area. The expression expresses an overall level or an average level. To be specific, an actual meaning to be expressed is that "the first area is entirely blurred to a smaller degree than the second area is entirely blurred; or pixels in the first area are averagely blurred to a smaller degree than pixels in the second area are averagely blurred". It should also be understood by a person skilled in the art that in an intuitive show of a target image, the following may be shown: a fuzzy degree of the target hairline in the target image is less than a fuzzy degree of the background, and a fuzzy degree of the portrait is less than a fuzzy degree of the background.

In a specific implementation, there may also be a possibility that a small portion of pixels of a foreground is blurred when a background is blurred, but the foreground is blurred to a smaller degree than the background is blurred. Therefore, the foreground may not be blurred or blurred to a smaller degree than the background is blurred. Blurring the background can highlight the foreground, for example, highlight a portrait.

Figure 6C:
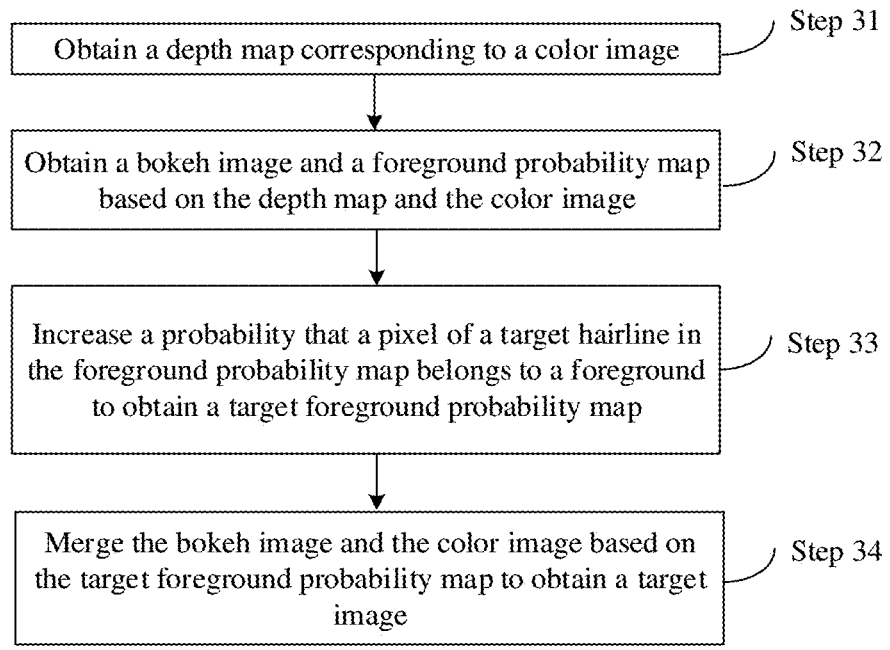
FIG. 6C is a schematic flowchart of a background blur method according to an embodiment of the present invention.

Optionally, S3 may include but is not limited to the following steps, and reference may be made to FIG. 6C.

Step 31: Obtain a depth map corresponding to the color image.

The "corresponding" herein may refer to correspondence in an image scenario or may refer to correspondence in a pixel location, and resolutions may also be the same.

In a specific implementation process, the depth map may be obtained in a manner such as a TOF, a structured light, a dual camera, or a dual pixel. For example, dual color cameras simultaneously collect images for a specific scenario, and a depth map is obtained based on the collected images by using an algorithm in the prior art. Optionally, the images may have a same resolution, for example, 720p. A resolution of a lens and an image capturing manner are not limited in the present invention. Any photographing module that can be figured out by a person skilled in the art without departing from a law of nature should fall within the protection scope of the present invention.

Optionally, the depth map may be photographed in real time, or may be photographed historically and stored.

Step 32: Obtain a bokeh image and a foreground probability map based on the depth map and the color image.

A blurring means may include but is not limited to circular filtering. For example, a possible implementation is as follows: converting into a corresponding filtering radius based on a depth and a current aperture, and performing low-pass filtering, namely, circular filtering, on the color image to obtain the bokeh image.

In a possible implementation, the foreground probability map may be obtained based on the depth, the current aperture, and a focusing location. The foreground probability map may be in a form of a matrix corresponding to image pixels, and each element in the matrix represents a probability that a pixel corresponding to the element belongs to the foreground. The focusing location may be a location at which a user clicks for selection or a photographing system performs automatic focus.

Step 33: Increase a probability that a pixel of the target hairline in the foreground probability map belongs to the foreground to obtain a target foreground probability map.

Step 33 aims to avoid blurring the pixel of the target hairline as far as possible or reduce a blurring degree of the target hairline when the image is blurred, that is, to avoid blurring the target hairline as far as possible.

Optionally, a probability that the target hairline belongs to the foreground may be increased to 1 (100%).

Step 34: Merge the bokeh image and the color image based on the target foreground probability map to obtain the target image.

It is not difficult to understand that pixels of the target foreground probability map, the bokeh image, and the color image are in a one-to-one correspondence. Optionally, a process of merging pixels at any location may be as follows:

A pixel at a corresponding location on the target image=foreground probability×pixel at a corresponding location on the color image+(1−foreground probability)×pixel at a corresponding location on the bokeh image.

It can be learned that in the overlapping area, hairline pixels are entirely blurred to a smaller degree than background pixels are entirely blurred, which highlights the hairline detail.

It should be understood that in the entire image, a foreground probability of a pixel identified as the background may be equal to or close to 0, and a foreground probability of a pixel identified as the foreground may be equal to or close to 1. It should be understood that to implement smooth transition of the image, not all pixels are judged only as the foreground and the background during blurring, so that there are some intermediate transition areas. To be specific, foreground probabilities of some pixels in the image range from 0 to 1.

Figure 7D:
FIG. 7D is a schematic diagram of blurring a hairline in the prior art.

In a blurring process of the background, because the background and the hairline in the overlapping area are precisely distinguished from each other, a blurring transition effect may be better, and a halo mistakenly diffused by the hairline in the background is reduced, so that transition between the hairline and the background is more natural, which improves an effect of bokeh for details. FIG. 7D shows an example of unnatural transition that is between the hairline and background and that is caused by a halo mistakenly diffused by the hairline in the background when a portrait is processed by the prior art. Compared with FIG. 4B showing a photographing effect of the present invention, FIG. 7D shows that a hairline detail in an overlapping area is also blurred. It can be learned that in the present invention, accuracy of detail blurring is improved, and a main body is highlighted, which brings a good photographing experience to a user.

Optionally, after S3, a display interface of the terminal may display only the target image or may display both the target image and an original image. Therefore, visual perception may be brought to a user intuitively, and the user decides which one to store. Alternatively, the terminal may store both the target image and the original image in an album.

Example 2—Photograph a Main Body, Highlight a Detail of the Main Body that Overlaps with a Background In many scenarios, a detail of a target main body may overlap with a background in an image. Specifically, both a pixel of the target main body and a pixel of the background exist in one area. In addition, because a detail has a relatively small quantity of pixels, when the image is processed, it is relatively difficult to distinguish whether the pixels of the detail belong to a foreground or the background. For example, hair is often determined as the background by an existing segmentation technology, and then erroneous determining occurs during hairline blurring in image blur processing, leading to worse image quality.

The method in example 1 is merely an implementation, and ideas and techniques of the present invention may be applied to a broader scenario. A main body is photographed, and a detail of the main body that overlaps with a background is reserved.

Optionally, in a photographing process or a subsequent blur processing process of an image, a photographing system or image software may first identify a type to which a current target main body belongs. For different types, image segmentation of different granularities may be performed by using different neural networks or algorithms; and a detail of the main body that overlaps with a background is determined by using a logical algorithm, and in a preview image or a displayed captured image, "the main body is highlighted, the background is blurred, and the detail of the main body that overlaps with the background is not blurred or is blurred to a relatively small degree".

Compared with example 1, example 2 provides a more universal image processing method. The method includes the following steps S5 to S7.

S5: Obtain a color image including a target main body (also referred to as a target object), where the color image includes a foreground and a background, and the target main body corresponds to the foreground.

The foreground may include a target portrait. It should be understood that the target portrait does not refer to a specific portrait. In addition, the foreground may correspond an object (for example, an animal or another main object) that needs to be highlighted when the color image is blurred, in other words, a main body image that is not blurred or is blurred to a relatively small degree. The target main body may include but is not limited to: a plant such as a dandelion, pampasgrass, or bunny tail grass, an animal such as Pomeranian, Samoyed, or a cat, or an accessory such as a woolen scarf. Overlapping between a detail of a main object and a background may further exist in another color image that cannot be described exhaustively. In practical application, the technical solution in this embodiment of the present invention may be used, provided that a detail of a main object overlaps with a background.

S6: Determine a target filamentous object from the color image, where the target filamentous object includes a part in which a filamentous object of the target main body overlaps with the background.

Optionally, S6 may include the following steps (step 61 to step 66).

Step 61: Perform image preprocessing: perform preprocessing such as image enhancement or normalization. Image preprocessing is a mature prior art, and details are not described in this embodiment. Preprocessing may enhance a feature of the color image, so that an edge feature between the main object and the background is more obvious, which improves accuracy of segmentation or analysis for an obtained image.

Step 62: Perform, by using a preset FCN, semantic segmentation on a preprocessed color image to obtain a filamentous object area and obtain a non-filamentous object area at the same time. The filamentous object area may correspond to a fifth mask area (mask 5). A grayscale value of each pixel in the non-filamentous object area may be represented by N1, a grayscale value of each pixel in the filamentous object area may be represented by N2, and N1 is unequal to N2.

Step 63: Perform scenario analysis on a color image part corresponding to the fifth mask area; and if a background in an RGB image corresponding to the fifth mask area has a weak texture, step 641 or step 642 may be performed; or if a background in an RGB image corresponding to the fifth mask area has a strong texture, step 642 may be performed.

Step 641: Perform, based on a matting algorithm, main body segmentation on a preprocessed RGB image obtained in step 61 to obtain a main object and a background. A grayscale value of each pixel in a main body area may be represented by any value that falls within (N3, N4] or [N4, N3). A value closer to N4 indicates a higher probability that the pixel is the main object. If the value is N4, the pixel is definitely a pixel of the main object. Each pixel in the background may be represented by N3. Optionally, N3 is less than N4, N3 is 0, and N4 is 255.

Step 642: Perform, based on the preset fully convolutional network, main body segmentation on the preprocessed RGB image obtained in step 61 to obtain a main object and a background. A grayscale value of each pixel in a main body area may be represented by any value that falls within (N3, N4] or [N4, N3). A value closer to N4 indicates a higher probability that the pixel is the main object. If the value is N4, the pixel is definitely a pixel of the main object. Each pixel in the background may be represented by N3. Optionally, N3 is less than N4, N3 is 0, and N4 is 255.

Step 65: Binarize a pixel grayscale of the entire image based on a main object segmentation result obtained in step 641 or step 642. Specifically, pixels that are 100% determined as the main object or 100% determined as the background are all logically labeled as N5, and pixels that are not completely determined as the main object or the background are all labeled as N6. After binarization, an area that includes all pixels represented by N6 may logically represent another "filamentous object area", that is, a sixth mask area (mask 6).

Optionally, the mask 6 may be further expanded. If several pixels around pixels that are N6 are modified from N5 to N6, a new area that includes all pixels represented by N6 may logically represent another "filamentous object area", that is, a seventh mask area (mask 7).

Optionally, N5 is less than N6, N5 is 0, and N6 is 255. Values of N5 and N6 are not limited in this embodiment, and any pair of unequal numbers may be used. It should be understood that the mask 6 or the mask 7 is obtained to more accurately determine a real filamentous object part of the main object that overlaps with the background.

Step 66: Perform an AND logical operation on pixels at a same location on the mask 5 obtained in step 62 and the mask 6 or the mask 7 obtained in step 65 and get an intersection. To be specific, an area that includes all pixels whose logical operation results are "true" is a target filamentous object area (mask 8). Compared with the mask 5, the mask 6, or the mask 7 obtained previously, the mask 8 more accurately corresponds to the filamentous object that overlaps with background.

Using the mask 6 to obtain the mask 8 may determine the filamentous object and a relatively small quantity of pixels near the filamentous object as the foreground. After the image is blurred subsequently, the pixels near the filamentous object are blurred to a relatively small degree, and the filamentous object is blurred to a smaller degree or is not blurred. Therefore, transition between the filamentous object and the background is more natural, and more filamentous object details are reserved.

Regardless of values of N1, N2, N3, N4, N5, and N6, logical meanings of N1, N2, N3, N4, N5, and N6 are "true" or "false" (for example, N1, N3, and N5 represent "false", and N2, N4, and N6 represent "true") in a logical operation. N1, N2, N3, N4, N5, and N6 each is used to represent a value of a pixel grayscale or a probability.

Because of diversity of a logical operation and image segmentation, no matter which manner is used, a manner shall fall within an implementation and the protection scope of the present invention, provided that the manner can be used to determine, from an image, a filamentous object of a target object that overlaps with a background.

S7: Perform blur processing on the color image to obtain a target image, where the target filamentous object is blurred to a smaller degree than the background is blurred, and the target object is blurred to a smaller degree than the background is blurred.

Optionally, S7 may include but is not limited to the following steps.

Step 71: Obtain a depth map corresponding to the color image. A specific operation is the same as step 31 or an equivalent alternative method.

Step 72: Obtain a bokeh image and a foreground probability map based on the depth map and the color image. A specific operation is the same as step 32 or an equivalent alternative method.

Step 73: Increase a probability that a pixel of the target filamentous object in the foreground probability map belongs to the foreground to obtain a target foreground probability map.

Step 74: Merge the bokeh image and the color image based on the target foreground probability map to obtain the target image.

It should be understood that example 1 is a special scenario of example 2. To be specific, segmentation methods for main objects and images in example 1 and example 2 may be slightly different. However, processing ideas for entire images in example 1 and example 2 are the same. Therefore, implementations of some methods, explanations of related terms, or expansions of a scenario or divergence of a technology fall within a scope that can be understood by a person skilled in the art, or reference may be adaptively made to a related part in example 1. For example, for S5, S6, and S7, reference may be correspondingly made to S1, S2, and S3; for step 61 to step 66, reference may be correspondingly made to step 21 to step 26; and for step 71 to step 74, reference may be correspondingly made to step 31 to step 34. In addition, reference may also be made to another possible implementation operation before or after a related step, and more implementations and details are not described herein.

The present invention provides an image processing method in which a "hairline-level" main body detail that is in an overlapping area and that appears in a background can be precisely determined from a color image, so that the main body detail is not considered as the background for blurring when the background is blurred, which improves a blur processing effect.

Figure 8:
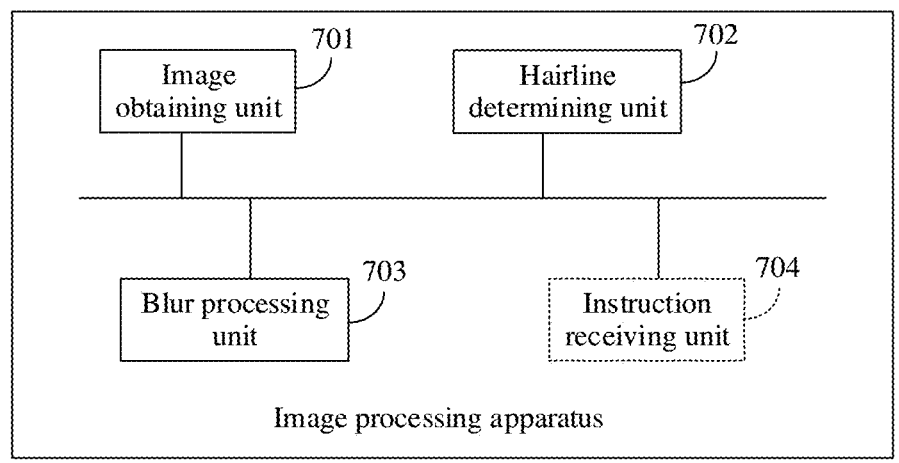
FIG. 8 is a schematic diagram of an image processing apparatus according to an embodiment of the present invention.

Based on the inventive concept of the foregoing method, as shown in FIG. 8, an embodiment of the present invention further provides an image processing apparatus, including an image obtaining unit 701, a hairline determining unit 702, and a blur processing unit 703.

The image obtaining unit 701 is configured to obtain a color image including a target portrait. The color image includes a foreground and a background, and the target portrait corresponds to the foreground. The unit is specifically configured to perform the related method mentioned in S1 in the foregoing example and an equivalent alternative method. The unit may be implemented by invoking one or more corresponding program instructions in a memory by using a processor.

The hairline determining unit 702 is configured to determine a target hairline from the color image. The target hairline includes a part in which a hairline of the target portrait overlaps with the background. The unit is specifically configured to perform the related method mentioned in S2 in the foregoing example and an equivalent alternative method. The unit may be implemented by invoking a corresponding program instruction in the memory by using the processor.

The blur processing unit 703 is configured to perform blur processing on the color image to obtain a target image. The target hairline is blurred to a smaller degree than the background is blurred, and the target portrait is blurred to a smaller degree than the background is blurred. The unit is specifically configured to perform the related method mentioned in S3 in the foregoing example and an equivalent alternative method. The unit may be implemented by invoking a corresponding program instruction in the memory by using the processor.

In an optional implementation, the image processing apparatus may further include an instruction receiving unit 704, configured to: before the image obtaining unit 701 obtains the color image including the target portrait, receive a target focus instruction, where the target focus instruction instructs to focus on the target portrait; or, based on an instruction, enter a target photographing mode, in which the target portrait can be automatically focused. The unit may be implemented by invoking a corresponding program instruction in the memory by using the processor or by responding to external input instructions.

Corresponding to example 2, the image obtaining unit 701, the hairline determining unit 702, and the blur processing unit 703 may separately perform the related methods mentioned in S5, S6, and S7 in the foregoing example and equivalent alternative methods.

Figure 9:
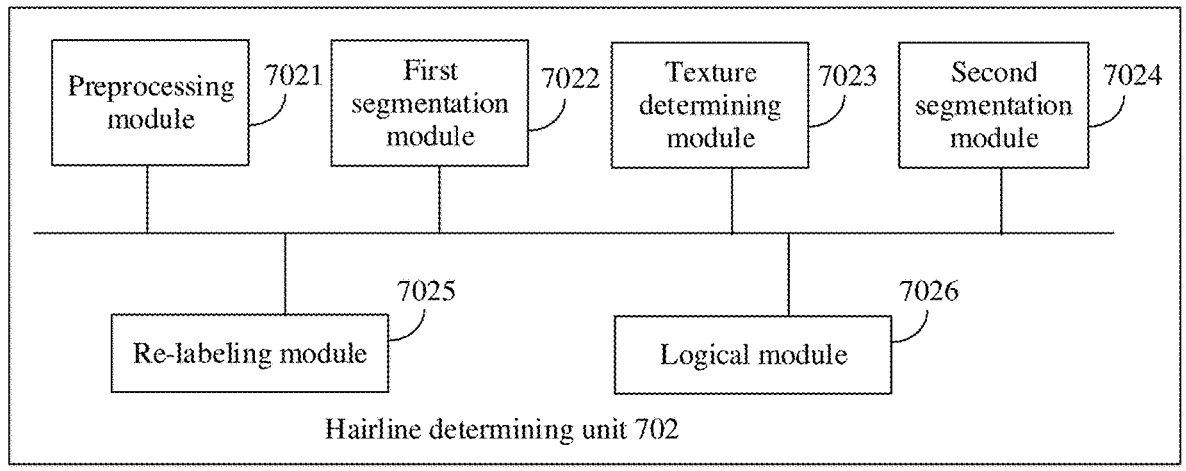
FIG. 9 is a schematic diagram of a hairline determining unit according to an embodiment of the present invention.

Optionally, as shown in FIG. 9, the present invention provides an implementation of the hairline determining unit 702. The hairline determining unit 702 includes a preprocessing module 7021, a first segmentation module 7022, a texture determining module 7023, a second segmentation module 7024, a re-labeling module 7025, and a logical module 7026.

The preprocessing module 7021 is configured to preprocess an image. The module may be specifically configured to perform the related method mentioned in step 21 or step 61 in the foregoing example and an equivalent alternative method. The module may be implemented by invoking a corresponding program instruction in the memory by using the processor.

The first segmentation module 7022 is configured to perform semantic segmentation on a preprocessed color image by using a preset FCN to obtain an envelope mask area corresponding to a filamentous object area. The module may be specifically configured to perform the related method mentioned in step 22 or step 62 in the foregoing example and an equivalent alternative method. The module may be implemented by invoking a corresponding program instruction in the memory by using the processor.

The texture determining module 7023 is configured to perform scenario analysis on a color image part corresponding to a filamentous object mask area. The module may be specifically configured to perform the related method mentioned in step 23 or step 63 in the foregoing example and an equivalent alternative method. The module may be implemented by invoking a corresponding program instruction in the memory by using the processor.

The second segmentation module 7024 is configured to: if a scenario analysis result is a weak texture, perform main body segmentation on the preprocessed image based on a matting algorithm to obtain a main object; or if a scenario analysis result is a strong texture, perform main body segmentation on the preprocessed image based on the preset fully convolutional network to obtain a main object. The module may be specifically configured to perform the related method mentioned in step 241, step 242, step 641, or step 642 in the foregoing example and an equivalent alternative method. The module may be implemented by invoking a corresponding program instruction in the memory by using the processor.

The re-labeling module 7025 is configured to binarize a pixel grayscale of the entire image based on an obtained main object segmentation result. The module may be specifically configured to perform the related method mentioned in step 25 or step 65 in the foregoing example and an equivalent alternative method. The module may be implemented by invoking a corresponding program instruction in the memory by using the processor.

The logical module 7026 is configured to obtain a target filamentous object based on a binarized image and the filamentous object mask area. The module may be specifically configured to perform the related method mentioned in step 26 or step 66 in the foregoing example and an equivalent alternative method. The module may be implemented by invoking a corresponding program instruction in the memory by using the processor.

Figure 10:
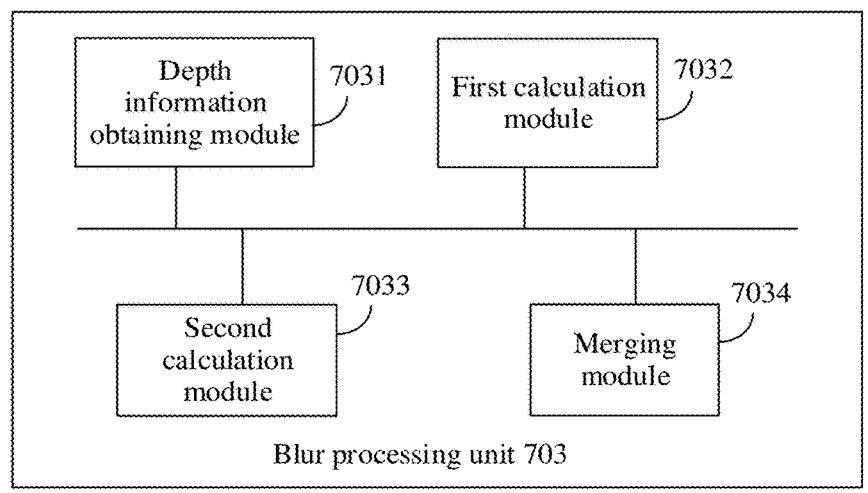
FIG. 10 is a schematic diagram of a blur processing unit according to an embodiment of the present invention.

Optionally, as shown in FIG. 10, the present invention provides an implementation of the blur processing unit 703. The blur processing unit 703 includes a depth information obtaining module 7031, a first calculation module 7032, a second calculation module 7033, and a merging module 7034.

The depth information obtaining module 7031 is configured to obtain a depth map corresponding to the color image. The module may be specifically configured to perform the related method mentioned in step 31 or step 71 in the foregoing example and an equivalent alternative method. The module may be implemented by invoking a corresponding program instruction in the memory by using the processor.

The first calculation module 7032 is configured to obtain a bokeh image and a foreground probability map based on the depth map and the color image. The module may be specifically configured to perform the related method mentioned in step 32 or step 72 in the foregoing example and an equivalent alternative method. The module may be implemented by invoking a corresponding program instruction in the memory by using the processor.

The second calculation module 7033 is configured to increase a probability that a pixel of the target filamentous object in the foreground probability map belongs to the foreground to obtain a target foreground probability map. The module may be specifically configured to perform the related method mentioned in step 33 or step 73 in the foregoing example and an equivalent alternative method. The module may be implemented by invoking a corresponding program instruction in the memory by using the processor.

The merging module 7034 is configured to merge the bokeh image and the color image based on the target foreground probability map to obtain the target image. The module may be specifically configured to perform the related method mentioned in step 34 or step 74 in the foregoing example and an equivalent alternative method. The module may be implemented by invoking a corresponding program instruction in the memory by using the processor.

The foregoing specific method examples, explanation and expression of technical features in the embodiments, and expansion of various implementations are also applicable to perform the corresponding method for the apparatus, and details are not described in the apparatus embodiment.

It should be understood that division of the modules in the apparatus is merely logical function division. In an actual implementation, all or some of the modules may be integrated into one physical entity, or may be physically separated. For example, each of the modules may be a separately disposed processing element, or may be integrated in a specific chip of a terminal, or may be stored in a storage element of a controller in a form of program code, and functions of the modules are invoked and executed by a specific processing element of a processor. In addition, the modules may be integrated together or implemented independently. The processing element may be an integrated circuit chip that has a signal processing capability. In an implementation process, steps in the foregoing methods or the foregoing modules can be implemented by using a hardware integrated logical circuit in the processing element, or by using instructions in a form of software. The processing element may be a general purpose processor, for example, a central processing unit (CPU for short), or may be one or more integrated circuits configured to implement the foregoing method, for example, one or more application-specific integrated circuits (ASICs for short), or one or more microprocessors, or one or more field-programmable gate arrays (FPGAs for short).

In the specification, claims, and accompanying drawings of the present invention, the terms "first", "second", and so on are intended to distinguish between similar objects but do not necessarily indicate a specific order or sequence. It should be understood that the data termed in such a way are interchangeable in proper circumstances so that the embodiments of the present invention described herein can be implemented in orders other than the order illustrated or described herein. Moreover, the terms "include", "contain" and any other variant mean to cover the non-exclusive inclusion, for example, a process, method, system, product, or device that includes a list of steps or modules is not necessarily limited to those steps or modules, but may include other steps or modules not expressly listed or other steps or modules inherent to such a process, method, system, product, or device.

A person skilled in the art should understand that the embodiments of the present invention may be provided as a method, a system, or a computer program product. Therefore, the present invention may use a form of hardware-only embodiments, software-only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process in the flowcharts and/or each block in the block diagrams and a combination of processes in the flowcharts and/or a combination of blocks in the block diagrams. These computer program instructions may be provided for a general-purpose computer, a dedicated computer, an embedded processor, or a processor of another programmable data processing device to generate a machine, so that the instructions executed by a computer or the processor of the another programmable data processing device generate an apparatus for implementing a specific function in one or more processes in the flowcharts and/or in one or more blocks in the block diagrams.

These computer program instructions may be stored in a computer readable memory that can instruct the computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

Although embodiments of the present invention have been described, a person skilled in the art can make changes and modifications to these embodiments once learning the basic inventive concept. Therefore, the following claims are intended to be construed as to cover the embodiments and all changes and modifications falling within the scope of the present invention. Obviously, the person skilled in the art can make various modifications and variations to the embodiments of the present invention without departing from the spirit and scope of the embodiments of the present invention. The present invention is intended to cover these modifications and variations, provided that these modifications and variations fall within the scope of protection defined by the following claims and the equivalent technologies of the following claims.

What is claimed is:

1. An image processing method, comprising:
obtaining a color image comprising a target portrait, wherein the color image comprises a foreground and a background, and the target portrait corresponds to the foreground;
determining a target hairline from the color image, wherein the target hairline comprises a part in which a hairline of the target portrait overlaps with the background; and
performing blur processing on the color image to obtain a target image, wherein the target hairline is blurred to a smaller degree than the background is blurred, and the target portrait is blurred to a smaller degree than the background is blurred,
wherein the determining a target hairline from the color image comprises:
performing semantic segmentation on the color image to obtain a first mask area, wherein the first mask area comprises a hairline appearing in the background and a portion of the background surrounding the hairline appearing in the background;
determining a degree of texture complexity of an image corresponding to the first mask area;

performing semantic segmentation on the color image using a preset neural network or performing portrait matting processing based on the degree of texture complexity of the image corresponding to the first mask area, to obtain a first portrait area, wherein the semantic segmentation using the preset neural network is performed on the color image if the degree of texture complexity of the image corresponding to the first mask area is higher than a predetermined threshold and the portrait matting processing is performed on the color image if the degree of texture complexity is lower than the predetermined threshold.

2. The image processing method according to claim 1, further comprising, before the obtaining a color image comprising a target portrait:

receiving a target focus instruction, wherein the target focus instruction instructs to focus on the target portrait, or based on an instruction, entering a target photographing mode, in which the target portrait can be automatically focused.

3. The image processing method according to claim 1, wherein the performing blur processing on the color image to obtain a target image comprises:

obtaining a depth map corresponding to the color image;

obtaining a bokeh image and a foreground probability map based on the depth map and the color image, wherein the foreground probability map includes a parameter value indicating a probability that a pixel in the color image belongs to the foreground;

increasing the parameter value indicating the probability that a pixel of the target hairline in the foreground probability map belongs to the foreground to obtain a target foreground probability map; and merging the bokeh image and the color image based on the target foreground probability map to obtain the target image.

4. The image processing method according to claim 3, wherein the determining a target hairline from the color image further comprises:

based upon determination that the degree of texture complexity of the image corresponding to the first mask area is higher than the predetermined threshold, determining the target hairline based on the first mask area and the first portrait area, wherein the first portrait area corresponds to the target portrait, and the first portrait area comprises the hairline appearing in the background.

5. The image processing method according to claim 3, wherein the first mask area corresponds to the target portrait and the determining a target hairline from the color image further comprises:

based upon determination that the degree of texture complexity of the image corresponding to the first mask area is lower than the predetermined threshold, determining the target hairline based on the first mask area and the first portrait area, wherein the first portrait area comprises the hairline appearing in the background.

6. A terminal device, comprising a memory, at least one processor, a bus, and a camera, wherein the memory, the at least one processor, and the camera are connected by using the bus;

the camera is configured to collect an image; and the memory is configured to store a computer program including instructions that, when executed by the at least one processor, cause the terminal device to: control the camera to collect an image, and perform the method according to claim 1.

7. The terminal device according to claim 6, wherein the terminal device further comprises an antenna system configured to transmit or receive a wireless communication signal under control of the at least one processor to implement wireless communication with a mobile communications network; and the mobile communication network comprises one or more of: a global system for mobile communications (GSM) network, a code division multiple access (CDMA) network, a third generation (3G) network, a fourth generation (4G) network, a fifth generation (5G) network, a frequency division multiple access (FDMA) network, a time division multiple access (TDMA) network, a personal digital cellular (PDC) network, a total access communications system (TACS) network, an advanced mobile phone system (AMPS) network, a wideband code division multiple access (WCDMA) network, a time division-synchronous code division multiple access (TD-SCDMA) network, a wireless fidelity (Wi-Fi) network, or a long term evolution (LTE) network.

8. An image processing apparatus, comprising a memory and one or more processors, the one or more processors are configured to:

perform an image obtaining operation comprising obtaining a color image including a target portrait, wherein the color image comprises a foreground and a background, and the target portrait corresponds to the foreground;

perform a hairline determining operation comprising determining a target hairline from the color image, wherein the target hairline comprises a part in which a hairline of the target portrait overlaps with the background; and perform blur processing on the color image to obtain a target image, wherein the target hairline is blurred to a smaller degree than the background is blurred, and the target portrait is blurred to a smaller degree than the background is blurred, wherein the hairline determining operation comprises:

performing semantic segmentation on the color image to obtain a first mask area, wherein the first mask area comprises a hairline appearing in the background and a portion of the background surrounding the hairline appearing in the background;

determining a degree of texture complexity of an image corresponding to the first mask area;

performing semantic segmentation on the color image using a preset neural network or performing portrait matting processing based on the degree of texture complexity of the image corresponding to the first mask area, wherein the semantic segmentation using the preset neural network is performed on the color image if the degree of texture complexity of the image corresponding to the first mask area is higher than a predetermined threshold and the portrait matting processing is performed on the color image if the degree of texture complexity is lower than the predetermined threshold, to obtain a first portrait area.

9. The image processing apparatus according to claim 8, wherein the one or more processors are further configured to:

perform an instruction receiving operation comprising: before performing the image obtaining operation, receiving a target focus instruction, wherein the target focus instruction instructs to focus on the target image, or, based on an instruction, entering a target photographing mode, in which the target portrait can be automatically focused.

10. The image processing apparatus according to claim 8, wherein the blur processing comprises:
obtaining a depth map corresponding to the color image;
obtaining a bokeh image and a foreground probability map based on the depth map and the color image, wherein the foreground probability map includes a parameter value indicating a probability that a pixel in the color image belongs to the foreground;
increasing the parameter value indicating the probability that a pixel of the target hairline in the foreground probability map belongs to the foreground to obtain a target foreground probability map; and
merging the bokeh image and the color image based on the target foreground probability map to obtain the target image.

11. The image processing apparatus according to claim 10, wherein the hairline determining operation further comprises:
based upon determination that the degree of texture complexity of the image corresponding to the first mask area is higher than the predetermined threshold, determining the target hairline based on the first mask area and the first portrait area, wherein the first portrait area corresponds to the target portrait, and the first portrait area comprises the hairline appearing in the background.

12. The image processing apparatus according to claim 10, wherein the first mask area corresponds to the target portrait and the hairline determining operation further comprises:
based upon determination that the degree of texture complexity of the image corresponding to the first mask area is lower than the predetermined threshold, determining the target hairline based on the first mask area and the first portrait area, wherein the first portrait area comprises the hairline appearing in the background.

13. A non-transitory storage medium storing information comprising instructions that, when executed by at least one processor, cause the at least one processor to perform operations comprising:
obtaining a color image comprising a target portrait, wherein the color image comprises a foreground and a background, and the target portrait corresponds to the foreground;
determining a target hairline from the color image, wherein the target hairline comprises a part in which a hairline of the target portrait overlaps with the background; and
performing blur processing on the color image to obtain a target image, wherein the target hairline is blurred to a smaller degree than the background is blurred, and the target portrait is blurred to a smaller degree than the background is blurred,
wherein the determining a target hairline from the color image comprises:
performing semantic segmentation on the color image to obtain a first mask area, wherein the first mask area comprises a hairline appearing in the background and a portion of the background surrounding the hairline appearing in the background;
determining a degree of texture complexity of an image corresponding to the first mask area:
performing semantic segmentation on the color image using a preset neural network or performing portrait matting processing based on the degree of texture complexity of the image corresponding to the first mask area,
wherein the semantic segmentation using the preset neural network is performed on the color image if the degree of texture complexity of the image corresponding to the first mask area is higher than a predetermined threshold and the portrait matting processing is performed on the color image if the degree of texture complexity is lower than the predetermined threshold, to obtain a first portrait area.

14. The non-transitory storage medium according to claim 13, wherein the operations further comprise, before the obtaining a color image comprising a target portrait:
receiving a target focus instruction, wherein the target focus instruction instructs to focus on the target portrait, or
based on an instruction, entering a target photographing mode, in which the target portrait can be automatically focused.

15. The non-transitory storage medium according to claim 13, wherein the performing blur processing on the color image to obtain a target image comprises:
obtaining a depth map corresponding to the color image;
obtaining a bokeh image and a foreground probability map based on the depth map and the color image, wherein the foreground probability map includes a parameter value indicating a probability that a pixel in the color image belongs to the foreground;
increasing the parameter value indicating the probability that a pixel of the target hairline in the foreground probability map belongs to the foreground to obtain a target foreground probability map; and
merging the bokeh image and the color image based on the target foreground probability map to obtain the target image.

16. The non-transitory storage medium according to claim 15, wherein the determining a target hairline from the color image further comprises:
based upon determination that the degree of texture complexity of the image corresponding to the first mask area is higher than the predetermined threshold, determining the target hairline based on the first mask area and the first portrait area, wherein the first portrait area corresponds to the target portrait, and the first portrait area comprises the hairline appearing in the background.

17. The non-transitory storage medium according to claim 15, wherein the determining a target hairline from the color image further comprises:
based upon determination that the degree of texture complexity of the image corresponding to the first mask area is lower than the predetermined threshold, determining the target hairline based on the first mask area and the first portrait area, wherein the first portrait area comprises the hairline appearing in the background.

* * * * *